(12) United States Patent
Torikai

(10) Patent No.: US 12,526,852 B2
(45) Date of Patent: Jan. 13, 2026

(54) COMMUNICATION APPARATUS, COMMUNICATION CONTROL METHOD, AND STORAGE MEDIUM

(71) Applicant: CANON KABUSHIKI KAISHA, Tokyo (JP)

(72) Inventor: Hiroyuki Torikai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 408 days.

(21) Appl. No.: 18/113,271

(22) Filed: Feb. 23, 2023

(65) Prior Publication Data

US 2023/0276511 A1 Aug. 31, 2023

(30) Foreign Application Priority Data

Feb. 28, 2022 (JP) .................................. 2022-030177

(51) Int. Cl.
*H04W 76/10* (2018.01)
*H04W 4/80* (2018.01)
*H04W 76/30* (2018.01)
*H04W 84/12* (2009.01)

(52) U.S. Cl.
CPC ............. *H04W 76/10* (2018.02); *H04W 4/80* (2018.02); *H04W 76/30* (2018.02); *H04W 84/12* (2013.01)

(58) Field of Classification Search
CPC ....... H04W 4/80; H04W 88/06; H04W 76/10; H04W 76/30; H04W 84/12; H04W 48/18; H04W 76/15; H04W 8/24
See application file for complete search history.

(56) References Cited

U.S. PATENT DOCUMENTS

| 9,503,588 B2 | 11/2016 | Takahashi | |
| 10,194,070 B2 | 1/2019 | Torikai | |
| 10,420,152 B2* | 9/2019 | Torikai | H04W 12/06 |
| 2017/0118653 A1* | 4/2017 | Chen | H04W 76/11 |
| 2022/0217516 A1* | 7/2022 | Grover | H04W 12/50 |

FOREIGN PATENT DOCUMENTS

| JP | 2015-088789 A | 5/2015 |
| JP | 2016-136689 A | 7/2016 |
| JP | 2018-037810 A | 3/2018 |
| JP | 2019-193145 A | 10/2019 |

OTHER PUBLICATIONS

Japanese Office Action dated Jun. 23, 2025, in related Japanese Patent Application No. 2022-030177.

* cited by examiner

*Primary Examiner* — Tuan H Nguyen
(74) *Attorney, Agent, or Firm* — VENABLE LLP

(57) ABSTRACT

A communication apparatus includes a recording medium having recorded therein an operating system OS, a first application that operates on the OS, and a second application that operates on the OS. The first application causes a processor to request the OS to establish connection for communication between the first application and an external apparatus, obtain identification information of the external apparatus, and store the identification information into a data sharing area provided by the OS. The second application causes the processor to obtain the identification information from the data sharing area, and based on the identification information, perform connection control for establishing connection for communication between the second application and the external apparatus.

8 Claims, 17 Drawing Sheets

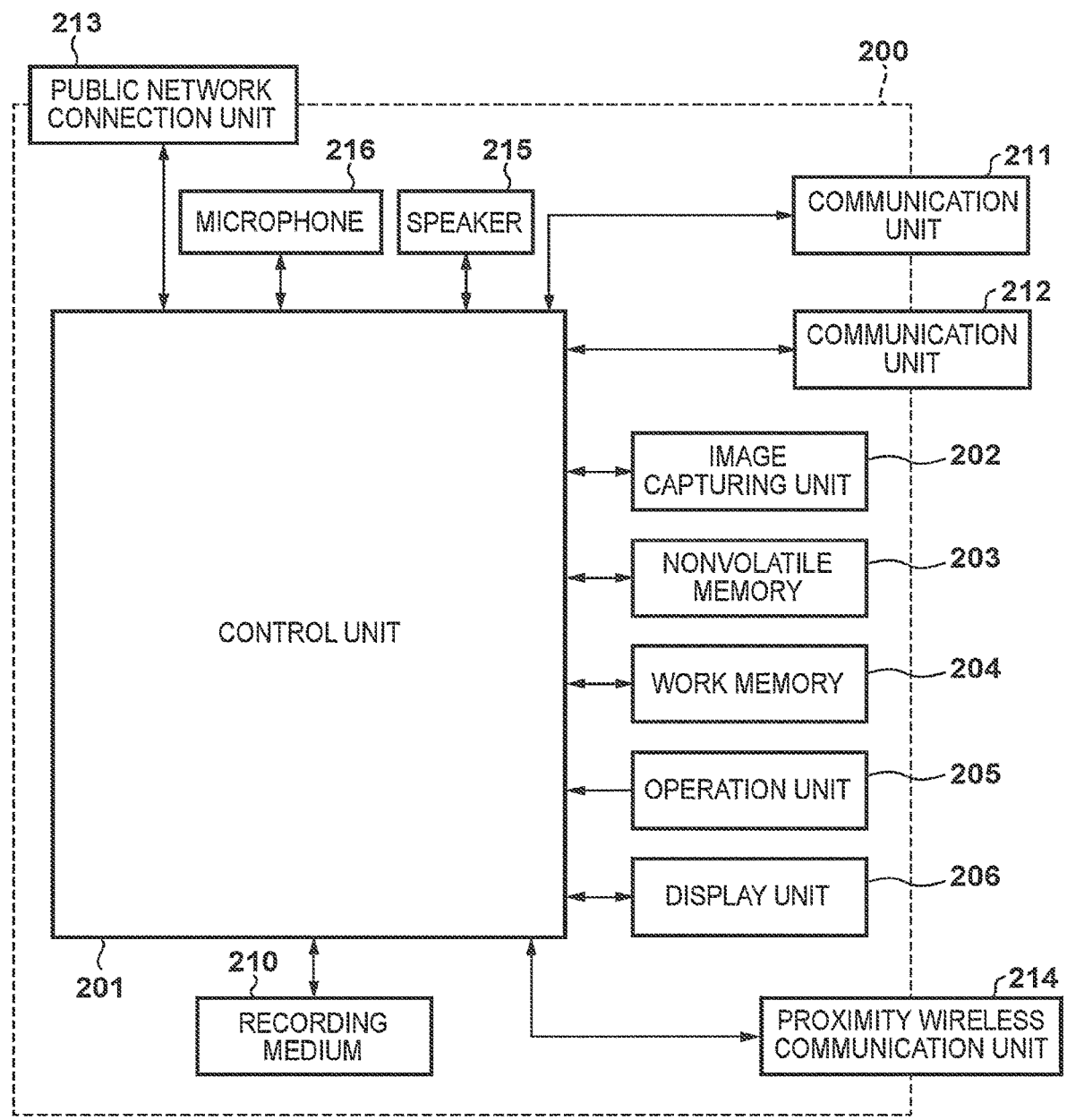

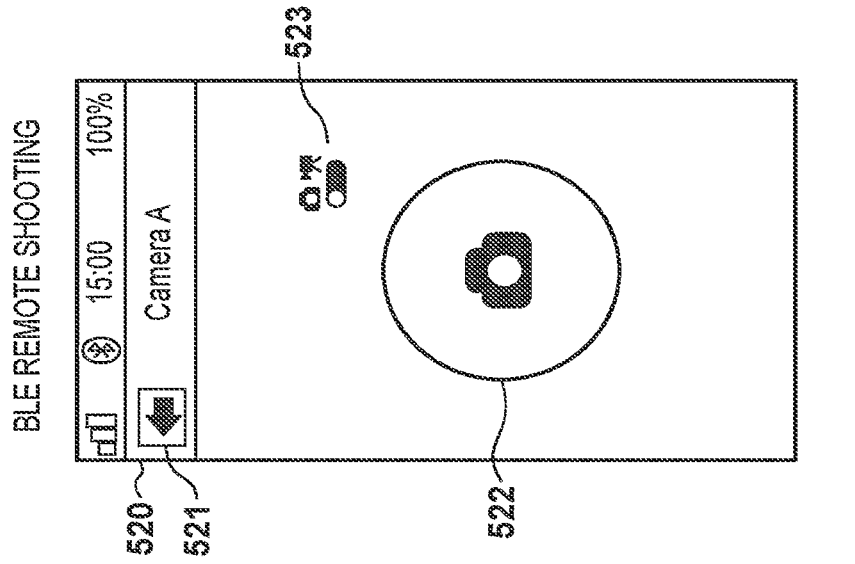
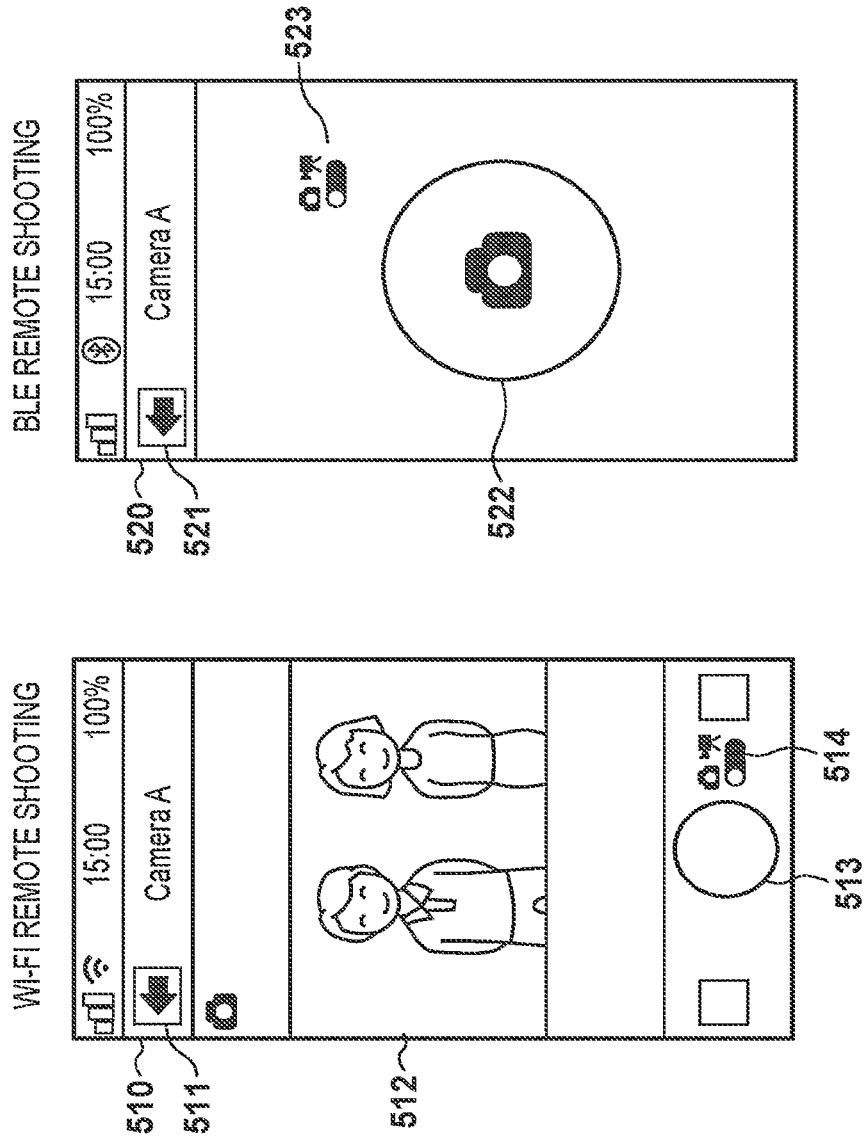
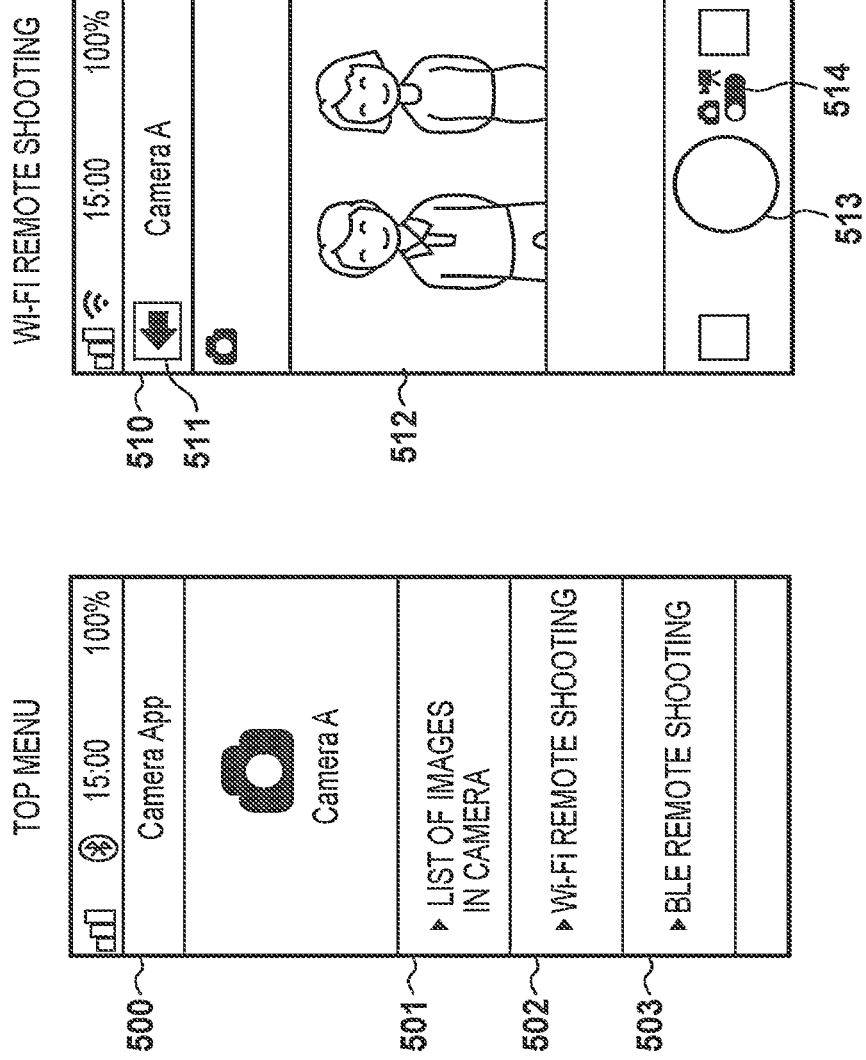

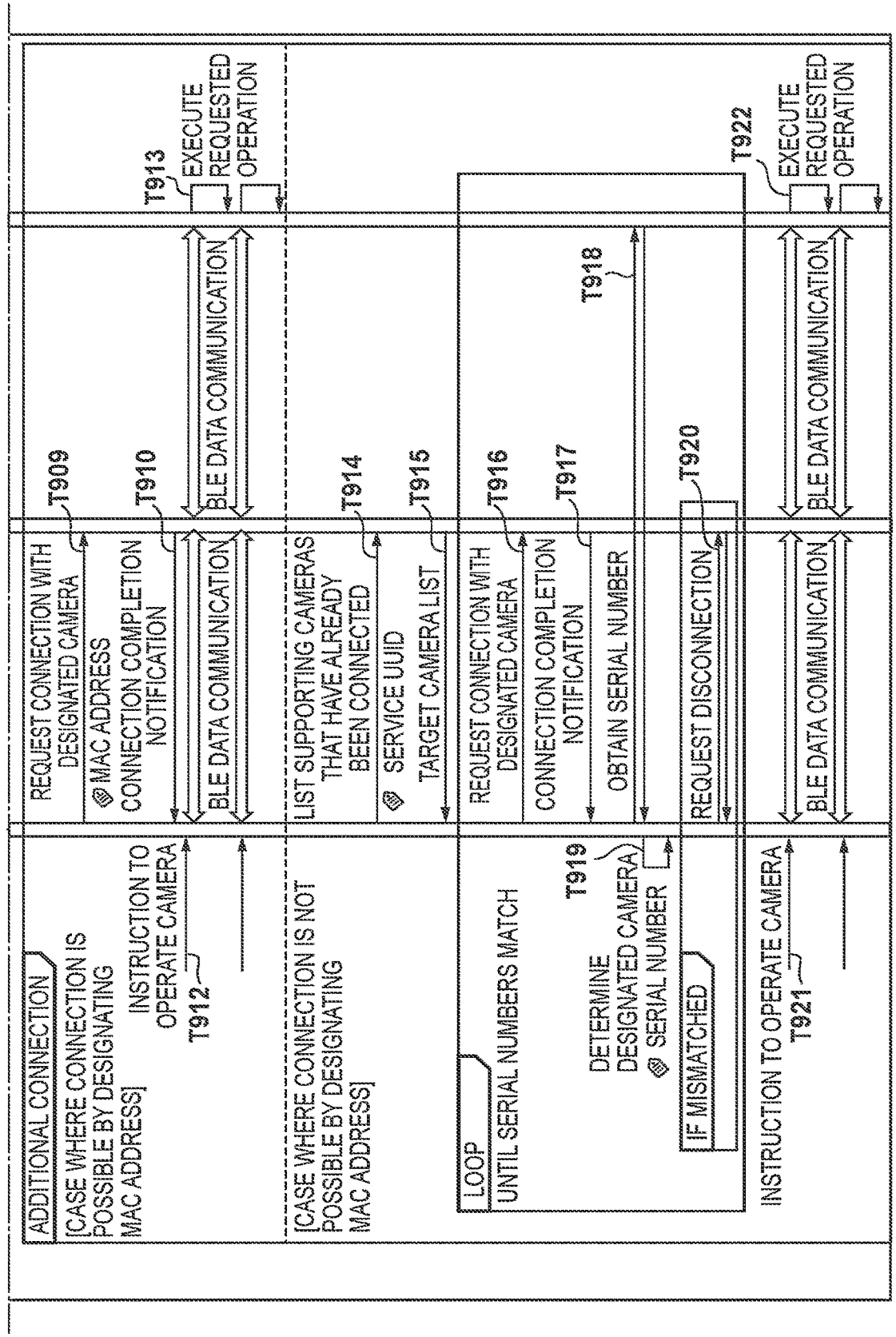

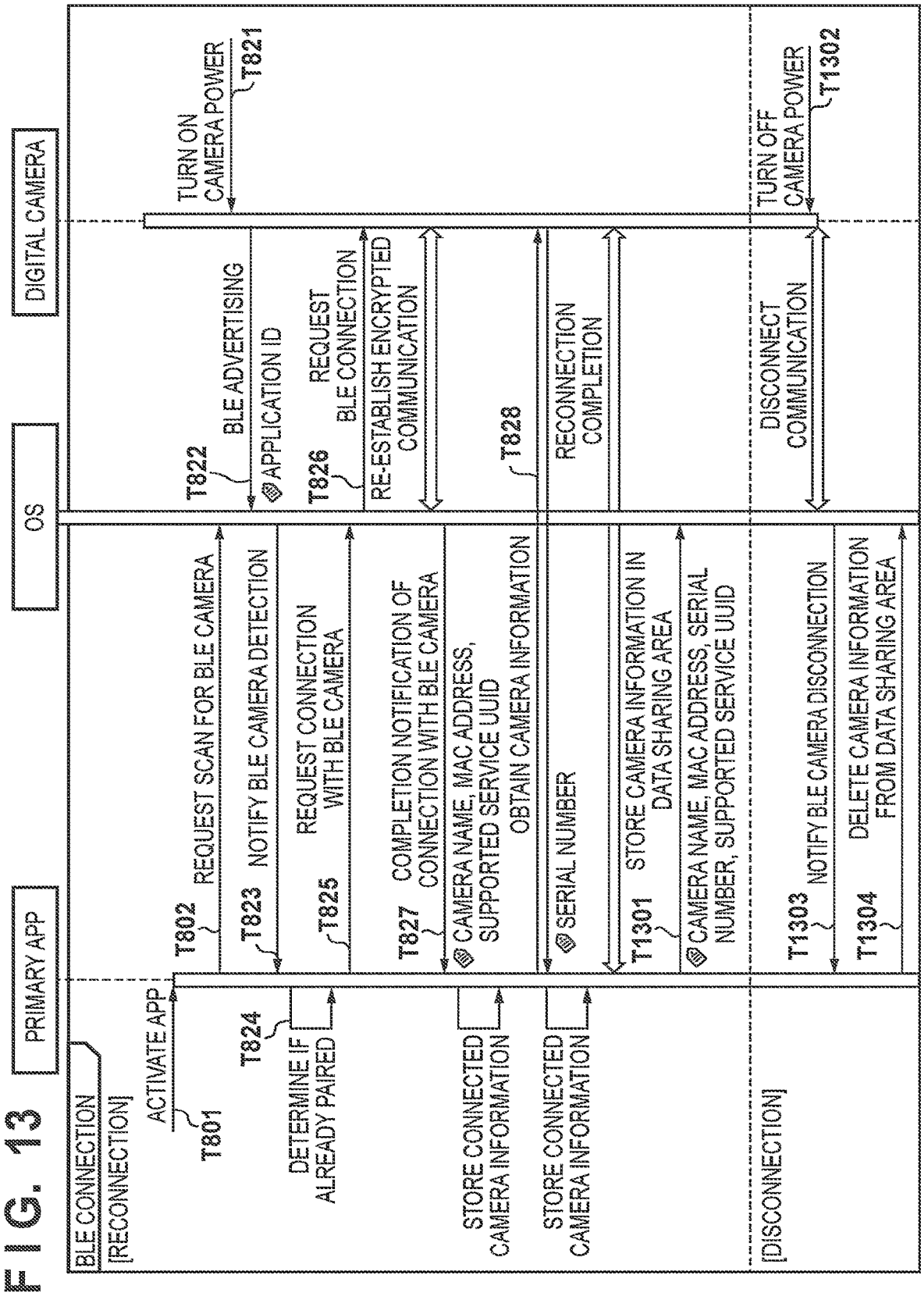

COMMUNICATION APPARATUS, COMMUNICATION CONTROL METHOD, AND STORAGE MEDIUM

BACKGROUND OF THE INVENTION

Field of the Invention

The present invention relates to a communication apparatus, a communication control method, and a storage medium.

Description of the Related Art

In recent years, it has been known that some models of digital cameras are provided with a wireless communication function and wirelessly connect to a smartphone. For example, Japanese Patent Laid-Open No. 2015-088789 discloses a digital camera that is provided with a wireless LAN and Bluetooth© and wirelessly connects to a smartphone. Also, Japanese Patent Laid-Open No. 2016-136689 discloses a technique to perform remote shooting by using a smartphone provided with a touch panel. Furthermore, Japanese Patent Laid-Open No. 2018-037810 discloses a technique to perform remote shooting via Bluetooth communication.

Assuming a case where an application on a smartphone is enabled to execute a plurality of functions related to a digital camera, making an attempt to embed all of the functions in one application can lead to a possibility that the design, update, distribution, and the like of the application will become complicated.

For example, in a case where a function of realizing remote shooting via a voice operation is provided, it is necessary for the application to coordinate with a cloud service, and moreover, there is a possibility that the cloud service to coordinate with will vary depending on the country and the region. Therefore, in some cases, separating a function dependent on a cloud service from an application that provides other functions, and providing the function via an application that is independent on a per-country basis or a per-region basis, facilitate the design, update, distribution, and the like of an application.

In a case where the same digital camera is controlled by a plurality of applications on a smartphone, it is necessary to enable the plurality of applications to connect to and communicate with the same digital camera. However, with conventional techniques, it is not easy to connect the plurality of applications to the same digital camera.

SUMMARY OF THE INVENTION

The present invention has been made in view of the aforementioned state, and provides a technique to enable a plurality of applications on a communication apparatus (e.g., a smartphone) to smoothly connect to an external apparatus (e.g., a digital camera).

According to a first aspect of the present invention, there is provided a communication apparatus, comprising: a recording medium having recorded therein an operating system (OS), a first application that operates on the OS, and a second application that operates on the OS; and a processor, wherein when executed by the processor, the first application causes the processor to: request the OS to establish connection for communication between the first application and an external apparatus; obtain identification information of the external apparatus; and store the identification information into a data sharing area provided by the OS, and when executed by the processor, the second application causes the processor to: obtain the identification information from the data sharing area; and based on the identification information, perform connection control for establishing connection for communication between the second application and the external apparatus.

According to a second aspect of the present invention, there is provided a communication control method executed by a processor, wherein the method comprises, by the processor executing a first application that operates on an operating system (OS), requesting the OS to establish connection for communication between the first application and an external apparatus, obtaining identification information of the external apparatus, and storing the identification information into a data sharing area provided by the OS, and the method comprises, by the processor executing a second application that operates on the OS, obtaining the identification information from the data sharing area, and based on the identification information, performing connection control for establishing connection for communication between the second application and the external apparatus.

According to a third aspect of the present invention, there is provided a non-transitory computer-readable storage medium which stores a first application that operates on an operating system (OS), wherein when executed by a processor of a communication apparatus, the first application causes the processor to: request the OS to establish connection for communication between the first application and an external apparatus; obtain identification information of the external apparatus; and store the identification information into a data sharing area provided by the OS.

According to a fourth aspect of the present invention, there is provided a non-transitory computer-readable storage medium which stores a second application that operates on an operating system (OS), wherein when executed by a processor of a communication apparatus, the second application causes the processor to: obtain, from a data sharing area provided by the OS, identification information of an external apparatus stored into the data sharing area by a first application; and based on the identification information, perform connection control for establishing connection for communication between the second application and the external apparatus.

Further features of the present invention will become apparent from the following description of exemplary embodiments with reference to the attached drawings.

BRIEF DESCRIPTION OF THE DRAWINGS

FIG. 2 is a hardware configuration diagram showing an exemplary configuration of a smartphone 200.

FIGS. 5A to 5C are diagrams showing examples of application screens.

FIGS. 9A and 9B are sequence diagrams showing a flow of processing in which the primary application accepts a user operation and executes a function, including the operations of the OS 311.

FIG. 13 is a sequence diagram of processing of the primary application and the OS 311 according to a second embodiment.

DESCRIPTION OF THE EMBODIMENTS

Figure 1A:
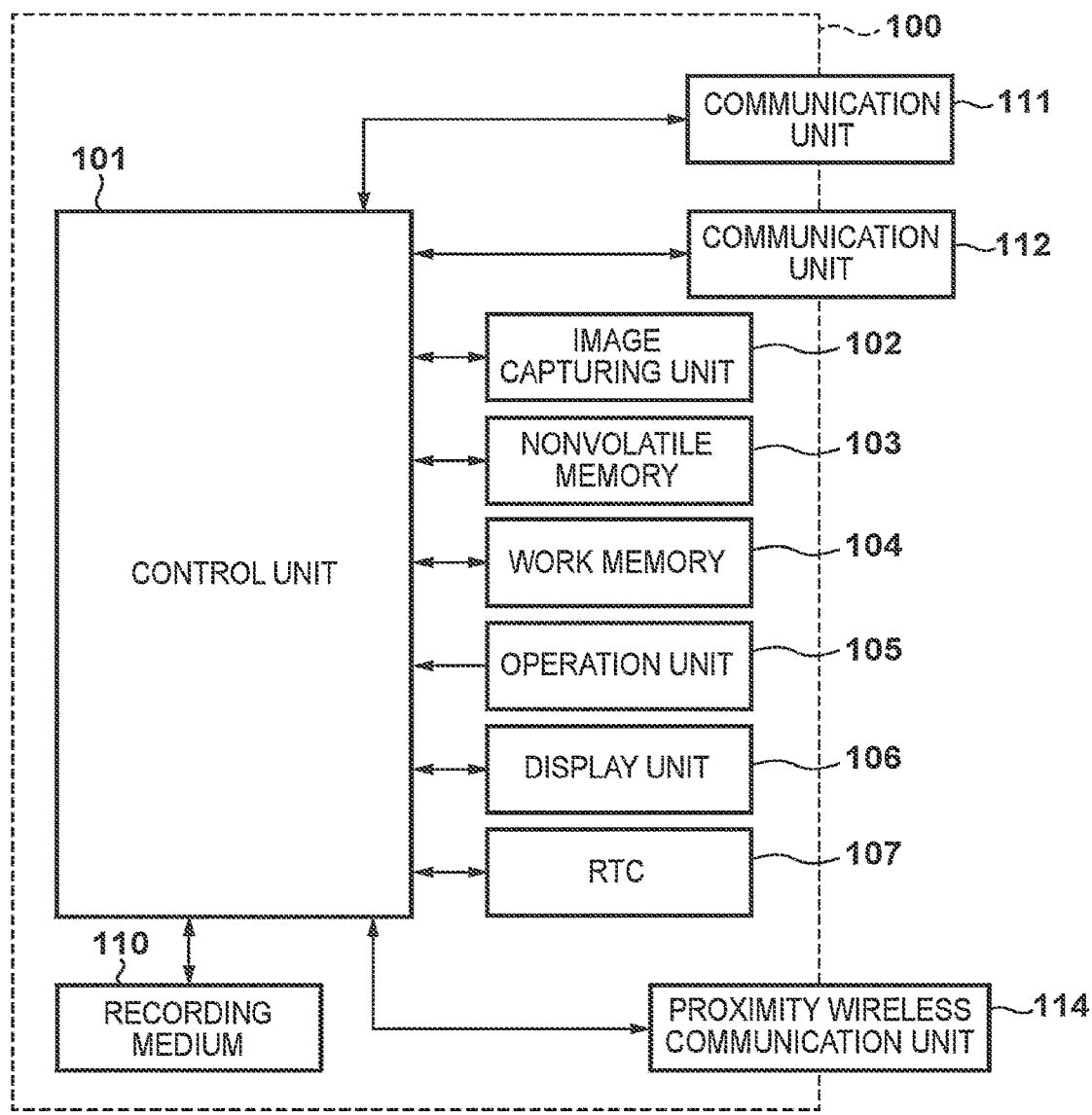
FIG. 1A is a hardware configuration diagram showing an exemplary configuration of a digital camera 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Configuration of Digital Camera 100>

FIG. 1A is a hardware configuration diagram showing an exemplary configuration of a digital camera 100, which is one example of a communication apparatus according to the present embodiment. Although the digital camera is described here as one example of the communication apparatus, the communication apparatus is not limited to this. For example, the communication apparatus may be a portable media player, a so-called tablet device, a personal computer, and so forth.

A control unit 101 controls each component of the digital camera 100 in accordance with input signals and a later-described program. Note that the entirety of the digital camera 100 may be controlled by a plurality of items of hardware sharing processing, instead of the control unit 101 controlling the entirety of the digital camera 100.

An image capturing unit 102 is composed of, for example: an optical system that controls an optical lens unit, a diaphragm, zooming, focusing, and the like; an image sensor for converting light (image) that has been directed via the optical lens unit into electrical image signals; and so forth. Generally, a Complementary Metal Oxide Semiconductor (CMOS) or a Charge Coupled Device (CCD) is used as the image sensor. Under control of the control unit 101, the image capturing unit 102 converts subject light that has been formed as an image by a lens included in the image capturing unit 102 into electrical signals using the image sensor, executes noise reduction processing and the like, and outputs digital data as image data. In the digital camera 100 according to the present embodiment, the image data is recorded into a recording medium 110 in accordance with the standard of Design Rule for Camera File System (DCF).

A nonvolatile memory 103 is a nonvolatile, electrically erasable and recordable memory, and stores, for example, a later-described program executed by the control unit 101.

A work memory 104 is used as a buffer memory for temporarily holding the image data captured by the image capturing unit 102, an image display memory for a display unit 106, a work area for the control unit 101, and so forth.

An operation unit 105 is used to accept an instruction to the digital camera 100 from a user. The operation unit 105 includes, for example, a power button used by the user to issue an instruction for turning ON/OFF the power of the digital camera 100, a release switch for issuing a shooting instruction, and a reproduction button for issuing an instruction for reproducing image data. It further includes such operation members as a dedicated connection button for starting communication with an external device via a later-described communication unit 111. In addition, a touch panel formed in the later-described display unit 106 is also included in the operation unit 105. Note that the release switch includes SW1 and SW2. SW1 is turned ON when the release switch is placed in a so-called half-depressed state. Consequently, an instruction for making a shooting preparation, such as AF (autofocus) processing, AE (automatic exposure) processing, AWB (auto white balance) processing, and EF (preliminary flash emission) processing is accepted. Also, SW2 is turned ON when the release switch is placed in a so-called fully-depressed state. Consequently, an instruction for performing shooting is accepted.

The display unit 106 displays viewfinder images at the time of shooting, displays shot image data, displays characters for interactive operations, and so forth. Note that the display unit 106 need not necessarily be built in the digital camera 100. It is sufficient that the digital camera 100 be capable of connecting to the internal or external display unit 106, and have at least a display control function of controlling display of the display unit 106.

An RTC 107 manages a clock. The user can set time via the operation unit 105. Also, it is permissible to adopt a configuration in which the RTC 107 sets time by obtaining time information via the communication unit 111, or adopt a clock setting acquired by a radio clock. A specific management method is not limited in particular, as long as time can be managed.

The recording medium 110 can record the image data output from the image capturing unit 102. The recording medium 110 may be configured to be attachable to and removable from the digital camera 100, or may be built in the digital camera 100. That is to say, it is sufficient that the digital camera 100 be configured to at least access the recording medium 110.

The communication unit 111 is an interface for connecting to an external apparatus. The digital camera 100 according to the present embodiment can exchange data with the external apparatus via the communication unit 111. For example, the image data generated by the image capturing unit 102 can be transmitted to the external apparatus via the communication unit 111. Note that in the present embodiment, the communication unit 111 includes an interface for communicating with the external apparatus via a so-called wireless LAN conforming to the standard of IEEE 802.11. The control unit 101 realizes wireless communication with the external apparatus by controlling the communication unit 111. Note that the communication method is not limited to the wireless LAN, and also includes, for example, an infrared communication method.

A communication unit 112 is composed of, for example, an antenna for wireless communication, and a modulation/demodulation circuit and a communication controller for processing wireless signals. The communication unit 112 realizes wireless communication conforming to the standard of IEEE 802.15 (so-called Bluetooth) by outputting modulated wireless signals from the antenna and demodulating wireless signals received by the antenna. In the present embodiment, with regard to Bluetooth communication, version 4.0 of Bluetooth Low Energy with low power consumption (hereinafter, BLE) is used. In this BLE communication, the range in which communication can be performed is small (i.e., the distance over which communication can be performed is short) compared to the wireless LAN communication. Furthermore, the communication speed is slower in the BLE communication than in the wireless LAN communication. On the other hand, power consumption is lower in the BLE communication than in the wireless LAN communication. The digital camera 100 according to the present embodiment can exchange data with the external apparatus via the communication unit 112. For example, image capture performed by the image capturing unit 102 can be controlled from the external apparatus via the communication unit 111. However, due to the slow communication speed, the image data generated by the image capturing unit 102 is not transmitted.

Note that the communication unit 112 of the digital camera 100 according to the present embodiment can operate in a peripheral mode or a central mode. Also, causing the communication unit 112 to operate in the peripheral mode enables the digital camera 100 according to the present embodiment to operate as a client device with Bluetooth. In a case where the digital camera 100 operates as the client device, communication is enabled by connection with an external device that is in the central mode. Note that authentication with the connected external device is performed by holding unique information of the connected external device in the nonvolatile memory 103 through the advance execution of pairing.

Furthermore, the communication unit 111 of the digital camera 100 according to the present embodiment has an AP mode in which it operates as an access point in an infrastructure mode, and a CL mode in which it operates as a client in the infrastructure mode. Also, causing the communication unit 111 to operate in the CL mode enables the digital camera 100 according to the present embodiment to operate as a CL device in the infrastructure mode. In a case where the digital camera 100 operates as the CL device, connecting to an AP device in the vicinity makes it possible to join in a network formed by the AP device. Furthermore, causing the communication unit 111 to operate in the AP mode enables the digital camera 100 according to the present embodiment to operate as a simplified AP, which is one type of AP with more limited functions (hereinafter, a simple AP). When the digital camera 100 operates as the simple AP, the digital camera 100 forms a network by itself.

This enables apparatuses in the vicinity of the digital camera 100 to recognize the digital camera 100 as the AP device and join in the network formed by the digital camera 100. It is assumed that a program for causing the digital camera 100 to operate in the above-described manner is held in the nonvolatile memory 103.

Note that the digital camera 100 according to the present embodiment is a simple AP, which is one type of AP but does not have a gateway function of transferring data received from a CL device to an internet provider and the like. Therefore, even if it has received data from another apparatus that has joined in the network formed by itself, it cannot transfer the data to a network such as the Internet.

Figure 1B:
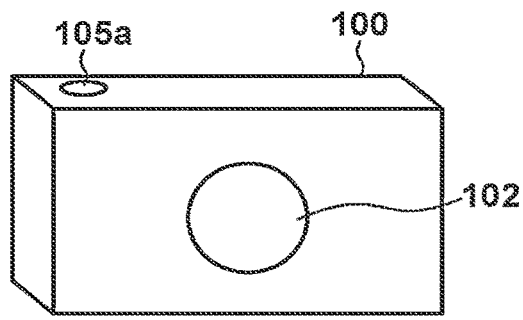
FIGS. 1B and 1C are diagrams showing an example of the external appearance of the digital camera 100.
Figure 1C:
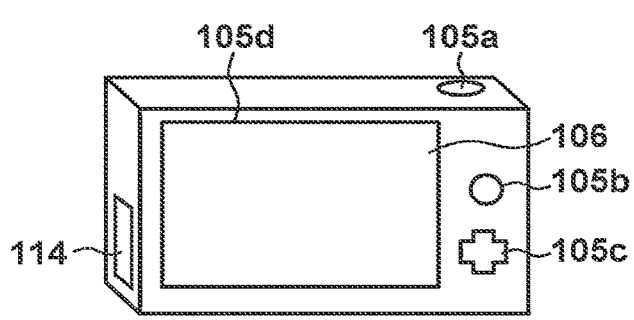

A proximity wireless communication unit 114 is composed of, for example, an antenna for wireless communication, and a modulation/demodulation circuit and a communication controller for processing wireless signals. The proximity wireless communication unit 114 realizes contactless proximity communication conforming to the standard of ISO/IEC 18092 (so-called Near Field Communication or NFC) by outputting modulated wireless signals from the antenna and demodulating wireless signals received by the antenna. The proximity wireless communication unit 114 according to the present embodiment is placed on a side portion of the digital camera 100, as shown in FIG. 1C as a reference.

The digital camera 100 and a later-described smartphone 200 start communication with, and become connected to, each other by bringing their respective proximity wireless communication unit 114 and proximity wireless communication unit 214 in proximity with each other. Note that in connecting the digital camera 100 to the smartphone 200 using the proximity wireless communication unit 114, the proximity wireless communication unit 114 and the proximity wireless communication unit 214 need not necessarily come into contact with each other. The proximity wireless communication unit 114 and the proximity wireless communication unit 214 can communicate with each other even when there is a certain distance therebetween; therefore, in order to connect their respective devices to each other, it is sufficient to bring them close to each other to the extent that the proximity wireless communication can be performed. In the following description, this act of bringing them close to each other to the extent that the proximity wireless communication can be performed, is also phrased as bringing them in proximity to each other.

Next, the external appearance of the digital camera 100 will be described. FIG. 1B and FIG. 1C are diagrams showing an example of the external appearance of the digital camera 100. A release switch 105a, a reproduction button 105b, a direction key 105c, and a touch panel 105d are operation members included in the aforementioned operation unit 105. Furthermore, the display unit 106 displays images obtained as a result of image capture performed by the image capturing unit 102.

<Configuration of Smartphone>

FIG. 2 is a hardware configuration diagram showing an exemplary configuration of the smartphone 200, which is one example of a communication apparatus that communicates with an external apparatus (e.g., the digital camera 100) in the present embodiment. Although the smartphone is described here as one example of the communication apparatus, the communication apparatus is not limited to this. For example, the communication apparatus may be a digital camera, a tablet device, a personal computer, or the like provided with a wireless function.

A control unit 201 includes a processor, and controls each component of the smartphone 200 in accordance with input signals and a later-described program. Note that the entirety of the smartphone 200 may be controlled by a plurality of items of hardware sharing processing, instead of the control unit 201 controlling the entirety of the smartphone 200.

An image capturing unit 202 is composed of, for example: an optical system that controls an optical lens unit, a diaphragm, zooming, focusing, and the like; an image sensor for converting light (image) that has been directed via the optical lens unit into electrical image signals; and so forth. Generally, a Complementary Metal Oxide Semiconductor (CMOS) or a Charge Coupled Device (CCD) is used as the image sensor. Under control of the control unit 201, the image capturing unit 202 converts subject light that has been formed as an image by a lens included in the image capturing unit 202 into electrical signals using the image sensor, executes noise reduction processing and the like, and outputs digital data as image data. In the smartphone 200 according to the present embodiment, the image data is recorded into a recording medium 210 in accordance with the standard of Design Rule for Camera File System (DCF).

A nonvolatile memory 203 is a nonvolatile, electrically erasable and recordable memory. An OS (operating system), which is basic software executed by the control unit 201, as well as an application that operates on this OS and realizes applicative functions, is recorded in the nonvolatile memory 203. Also, in the present embodiment, an application for communicating with the digital camera 100 is stored in the nonvolatile memory 203.

A work memory 204 is used as a buffer memory for temporarily holding the image data captured by the image capturing unit 202, an image display memory for a display unit 206, a work area for the control unit 201, and so forth.

An operation unit 205 is used to accept an instruction to the smartphone 200 from a user. The operation unit 205 includes, for example, such operation members as a power button used by the user to issue an instruction for turning ON/OFF the power of the smartphone 200, and a touch panel formed in the display unit 206.

The display unit 206 displays image data, displays characters for interactive operations, and so forth. Note that the display unit 206 need not necessarily be included in the smartphone 200. It is sufficient that the smartphone 200 be capable of connecting to the display unit 206, and have at least a display control function of controlling display of the display unit 206.

The recording medium 210 can record image data that has been transferred to the control unit 201 via a communication unit 211 in the smartphone 200. The recording medium 210 may be configured to be attachable to and removable from the smartphone 200, or may be built in the smartphone 200. That is to say, it is sufficient that the smartphone 200 have at least a function of accessing the recording medium 210.

The communication unit 211 is an interface for connecting to an external apparatus. The smartphone 200 according to the present embodiment can exchange data with the external apparatus via the communication unit 211. In the present embodiment, the communication unit 211 includes an antenna, and the control unit 201 can connect to the digital camera 100 via the antenna. Note that in the present embodiment, the communication unit 211 includes an interface for communicating with the external apparatus via a so-called wireless LAN conforming to the standard of IEEE 802.11. The control unit 201 realizes wireless communication with the external apparatus by controlling the communication unit 211. Note that the communication method is not limited to the wireless LAN, and also includes, for example, an infrared communication method.

A communication unit 212 is an interface for connecting to the external apparatus. The smartphone 200 according to the present embodiment can exchange data with the external apparatus via the communication unit 212. For example, image data generated by the digital camera 100 can be received via the communication unit 212. Note that in the present embodiment, the communication unit 212 includes an interface for communicating with the external apparatus via so-called Bluetooth© conforming to the standard of IEEE 802.15.1. The control unit 201 realizes wireless communication with the external apparatus by controlling the communication unit 212. Note that the communication method is not limited to Bluetooth, and also includes, for example, a wireless LAN known as the standard of IEEE 802.11, or an infrared communication method.

Note that the communication unit 212 of the smartphone 200 according to the present embodiment can operate in a peripheral mode or a central mode. Also, causing the communication unit 212 to operate in the central mode enables the smartphone 200 according to the present embodiment to operate as a server device with Bluetooth. In a case where the smartphone 200 operates as the server device, communication is enabled by connecting to an external device that is in the peripheral mode. Note that with regard to authentication with the connected external device, unique information of the connected external device is held in the nonvolatile memory 203 through the advance execution of pairing.

A proximity wireless communication unit 214 is composed of, for example, an antenna for wireless communication, and a modulation/demodulation circuit and a communication controller for processing wireless signals. The proximity wireless communication unit 214 realizes contactless proximity communication conforming to the standard of ISO/IEC 18092 (so-called Near Field Communication or NFC) by outputting modulated wireless signals from the antenna and demodulating wireless signals received by the antenna. The proximity wireless communication unit 214 of the present embodiment is placed on a side portion of the smartphone 200.

Furthermore, the smartphone 200 also includes a speaker 215 and a microphone 216.

<Bluetooth Pairing>

Figure 3A:
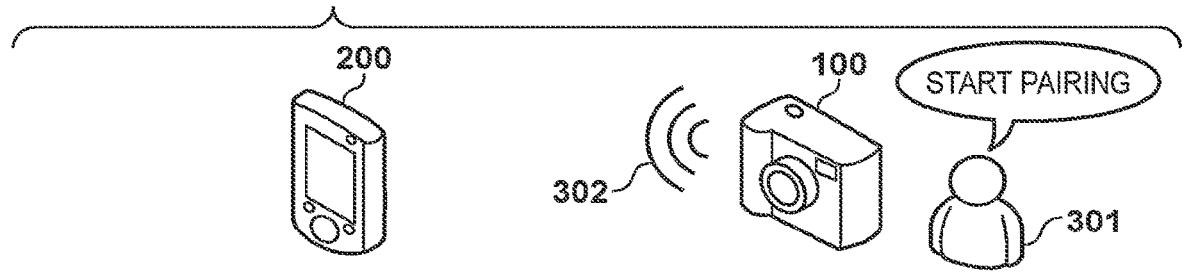
FIGS. 3A to 3C are system configuration diagrams for describing processing in which the digital camera 100 and the smartphone 200 establish pairing for communication via Bluetooth.
Figure 3B:
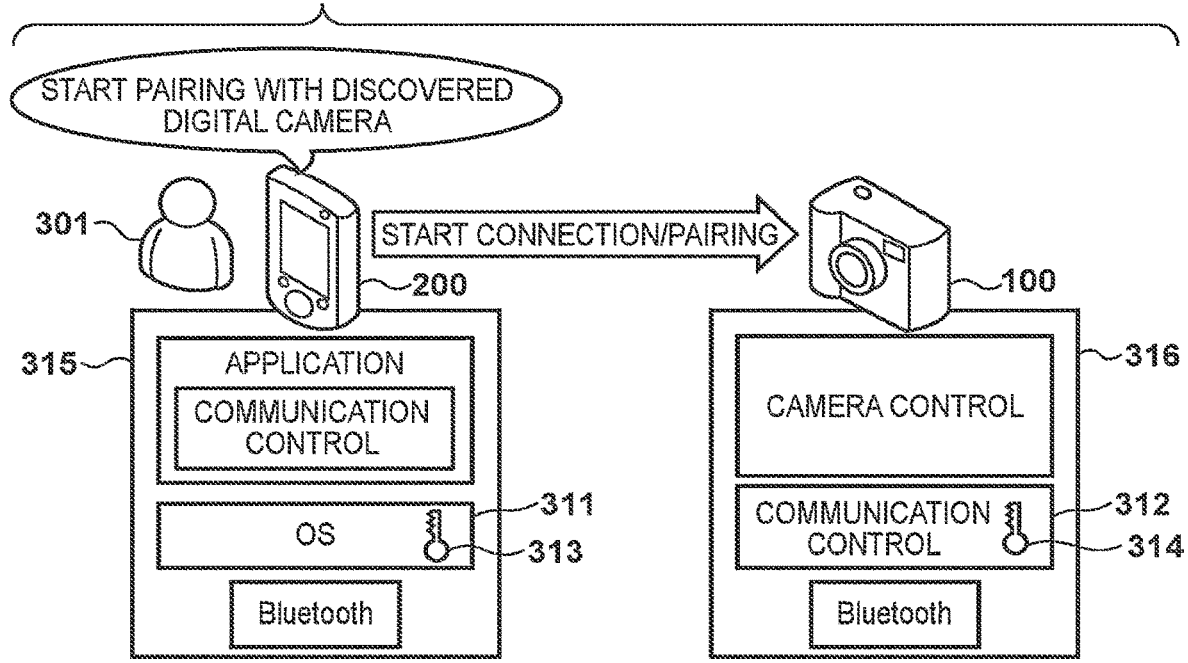
Figure 3C:
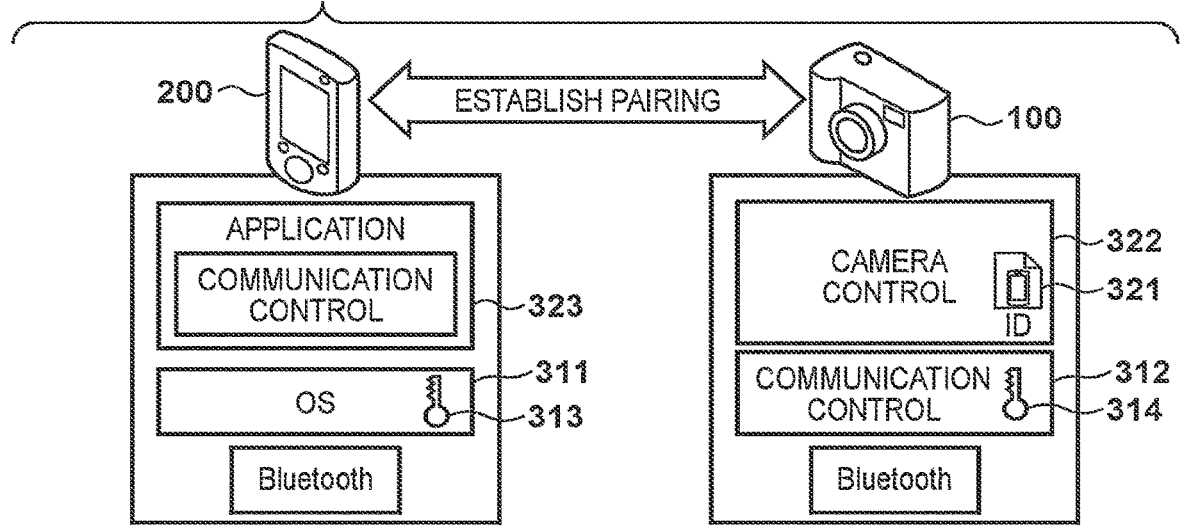

FIGS. 3A to 3C are system configuration diagrams for describing processing in which the digital camera 100 and the smartphone 200 establish pairing for communication via Bluetooth. The following describes a flow from when a user 301 starts Bluetooth pairing on digital camera 100 to when pairing with the smartphone 200 is established.

In FIG. 3A, the user 301 executes a pairing start of a Bluetooth setting function by operating the digital camera 100. Once the Bluetooth pairing has been started, the digital camera 100 sends out an advertising signal 302 to the surrounding.

FIG. 3B shows a state where the digital camera 100 and the smartphone 200 have made a Bluetooth connection with each other and exchanged keys for encrypted communication. The smartphone 200 receives, via the communication unit 212, the advertising signal that has been sent out by the digital camera 100 via the communication unit 112. Then, the smartphone 200 detects a pairing request of the digital camera 100 based on the advertising signal, and displays an indication that a digital camera has been detected on the display unit 206. Upon receiving, from the user 301, an operation to start pairing with the detected digital camera 100, the smartphone 200 makes a Bluetooth connection request to the digital camera 100. Here, the smartphone 200 notifies the digital camera 100 of a pairing request, exchanges keys for encryption of communication data, and places the smartphone 200 and the digital camera 100 in a state where encrypted communication can be performed therebetween. The exchanged keys for decrypting the encrypted communication data are stored in a communication control module 312 (key 314) in a software module component 316, which operates on the control unit 101 of the digital camera 100, in the digital camera 100, and stored in an OS 311 (key 313) in a software module component 315, which operates on the control unit 201 of the smartphone 200, in the smartphone 200. When the key 313 is stored in the OS 311, the OS 311 is in a state where it can perform encrypted communication with the digital camera 100. This state is a state where the pairing has been carried out on an OS layer.

FIG. 3C is a diagram showing a state where the smartphone 200 has provided an application ID 321 to the digital camera 100 via encrypted communication after the digital camera 100 and the smartphone 200 have made a Bluetooth connection with each other and have been placed in a state where they can perform encrypted communication with each other. Once the application ID 321 has been provided to the digital camera 100, the digital camera 100 stores the application ID 321 in a camera control module 322, determines that the pairing with the smartphone 200 has been established, and is placed in a paired state. This state is a state where the pairing has been carried out on an application layer.

In the case of BLE, once the connection has been established, an application 323 of the smartphone 200 can obtain service universally unique identifiers (service UUIDs) indicating the functions that can be used in the digital camera 100 from information included in a connection completion notification from the OS 311. The smartphone 200 can perform communication for realizing the functions provided by these service UUIDs. These service UUIDs may be standard BASE UUIDs that are defined based on communication specifications, or may be Vender Specific UUIDs that are uniquely implemented on the digital camera 100.

As has been described above with reference to FIG. 3B and FIG. 3C, the Bluetooth connection between the digital camera 100 and the smartphone 200 is performed on two layers: connection on the OS layer, and later connection on the application layer, which uses a connection path of the OS layer.

<Bluetooth Reconnection>

Figure 4A:
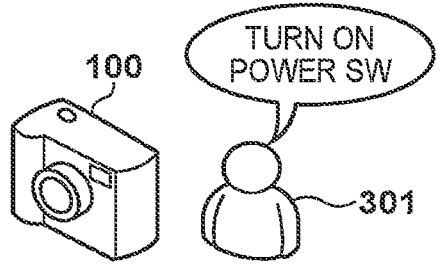
FIGS. 4A to 4C are diagrams for describing processing in which the paired digital camera 100 and smartphone 200 become reconnected to each other via Bluetooth.
Figure 4B:
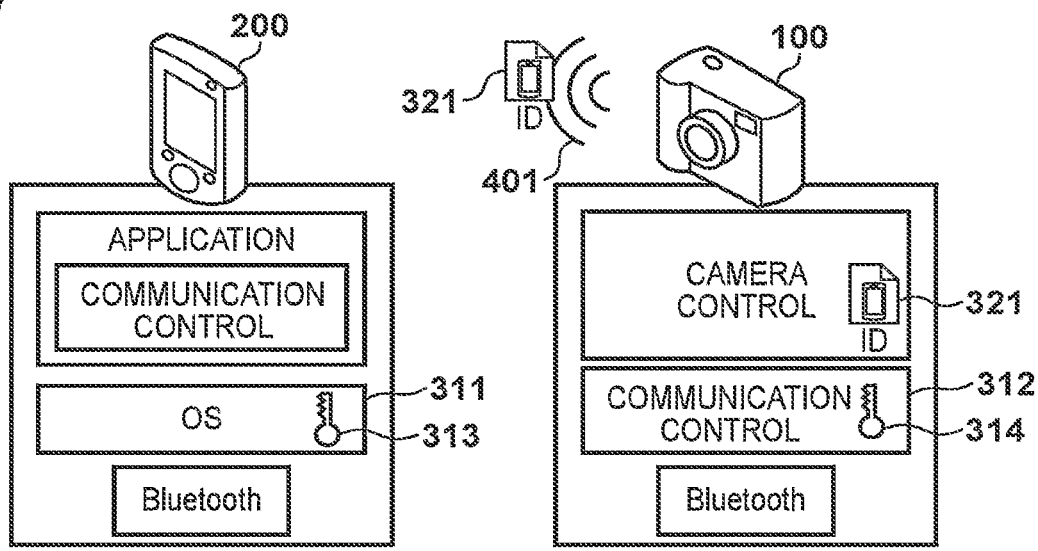
Figure 4C:
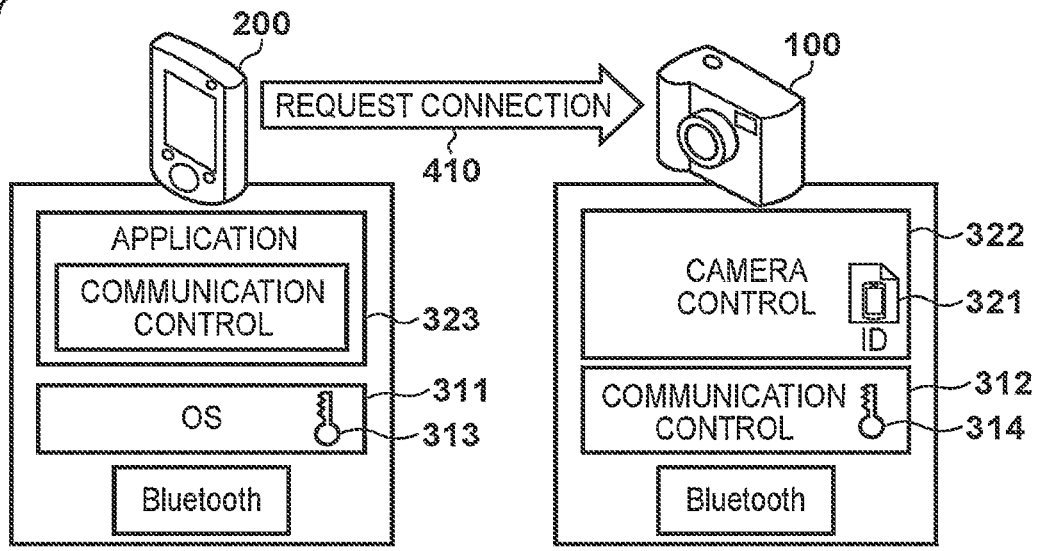

Next, with reference to FIGS. 4A to 4C, a description is given of processing in which the paired digital camera 100 and smartphone 200 become reconnected to each other via Bluetooth.

FIG. 4A is a diagram at the time of starting the reconnection. Once the user 301 has made the Bluetooth functions of the digital camera 100 usable by, for example, turning ON a power switch of the digital camera 100 or inserting a battery into the digital camera 100, the digital camera 100 sends out an advertising signal 401 to the surrounding for the purpose of Bluetooth connection.

As shown in FIG. 4B, the advertising signal 401 that is sent out by the digital camera 100 includes the application ID 321, which was obtained by the digital camera 100 from the smartphone 200 when establishing the pairing. The smartphone 200 receives, via the communication unit 212, the advertising signal that was sent out by the digital camera 100 via the communication unit 112, distinguishes the application ID of itself from the advertising signal, and determines that the digital camera 100 can be connected to itself.

Once the smartphone 200 has determined that the application ID included in the advertising signal is the application ID 321 of itself, it makes a Bluetooth connection request to the digital camera 100 as shown in FIG. 4C. As a result, the Bluetooth connection is established again between the digital camera 100 and the smartphone 200. This is a state where the reconnection has been made on the OS layer, and the reconnection has been made also on the application layer.

<Description of Application Screens>

FIGS. 5A to 5C are diagrams showing examples of application screens according to the present embodiment. FIG. 5A shows a top menu screen 500 displayed in a state where the digital camera 100 and the smartphone 200 have been connected to each other via Bluetooth. The top menu screen 500 displays menu buttons of executable functions while displaying the connection state of the camera. An in-camera image display button 501 corresponds to a function of displaying a list of images inside the camera. A Wi-Fi remote shooting button 502 corresponds to a function of issuing an instruction for performing shooting on the camera while displaying the camera's live view. A BLE remote shooting button 503 corresponds to a function of issuing a shooting instruction to the camera via Bluetooth communication. Note that the functions executed via the in-camera image display button 501 and the Wi-Fi remote shooting button 502 handle data that is large for the communication speed of Bluetooth, such as image data and live-view data. Therefore, these functions have a function of automatically switching from Bluetooth communication to Wi-Fi communication when executed. In this case, the smartphone 200 shares communication parameters (an SSID, a password, and the like) that are necessary for wireless LAN connection with the digital camera 100 via Bluetooth. The smartphone 200 and the digital camera 100 establish wireless LAN connection using the shared communication parameters.

FIG. 5B shows a Wi-Fi remote shooting screen 510, which is an example of a screen of a function that is executed via the Wi-Fi remote shooting button 502 and issues an instruction for performing shooting on the camera while displaying the camera's live view. The Wi-Fi remote shooting screen 510 includes a return button 511, an area 512 that displays a live view received from the camera, a release button 513, and a still image/moving image switch 514. The user can transmit a shooting instruction to the camera and shoot an image by tapping the release button 513. Furthermore, the user can switch between a still image mode and a moving image mode by operating the still image/moving image switch 514. When the user has finished using the function, the user can make a screen transition to the top menu screen 500 by tapping the return button 511.

FIG. 5C shows a BLE remote shooting screen 520, which is an example of a screen of a function that is executed via the BLE remote shooting button 503 and issues an instruction for performing shooting on the camera via Bluetooth communication. On the BLE remote shooting screen 520, although an area for displaying a live view received from the camera is not provided, a large release button 522 is arranged and displayed instead. The user can transmit a shooting instruction to the camera and shoot an image by tapping the release button 522. The BLE remote shooting screen 520 also includes a return button 521 and a still image/moving image switch 523. The user can switch between a still image mode and a moving image mode by operating the still image/moving image switch 523. When the user has finished using the function, the user can make a screen transition to the top menu screen 500 by tapping the return button 521.

The present embodiment is described in relation to a configuration in which, among the plurality of functions described above, the function of the BLE remote shooting screen 520 is provided to the user via another application. Providing a part of the functions as another application makes it possible to achieve such advantages as an improvement in the degree of freedom of application development.

<Problems Associated with Realization of Part of Functions Via Another Application>

In the following description, an application that displays the top menu screen 500 is referred to as a "primary application" or "representative application". Also, another application that provides functions (e.g., the functions of the BLE remote shooting screen 520) different from the functions provided by the primary application is referred to as a "secondary application".

When the secondary application attempts to make a Bluetooth connection with the digital camera 100 in accordance with conventional techniques after the primary application made a Bluetooth connection with the digital camera 100, the following problems arise.

Figure 6:
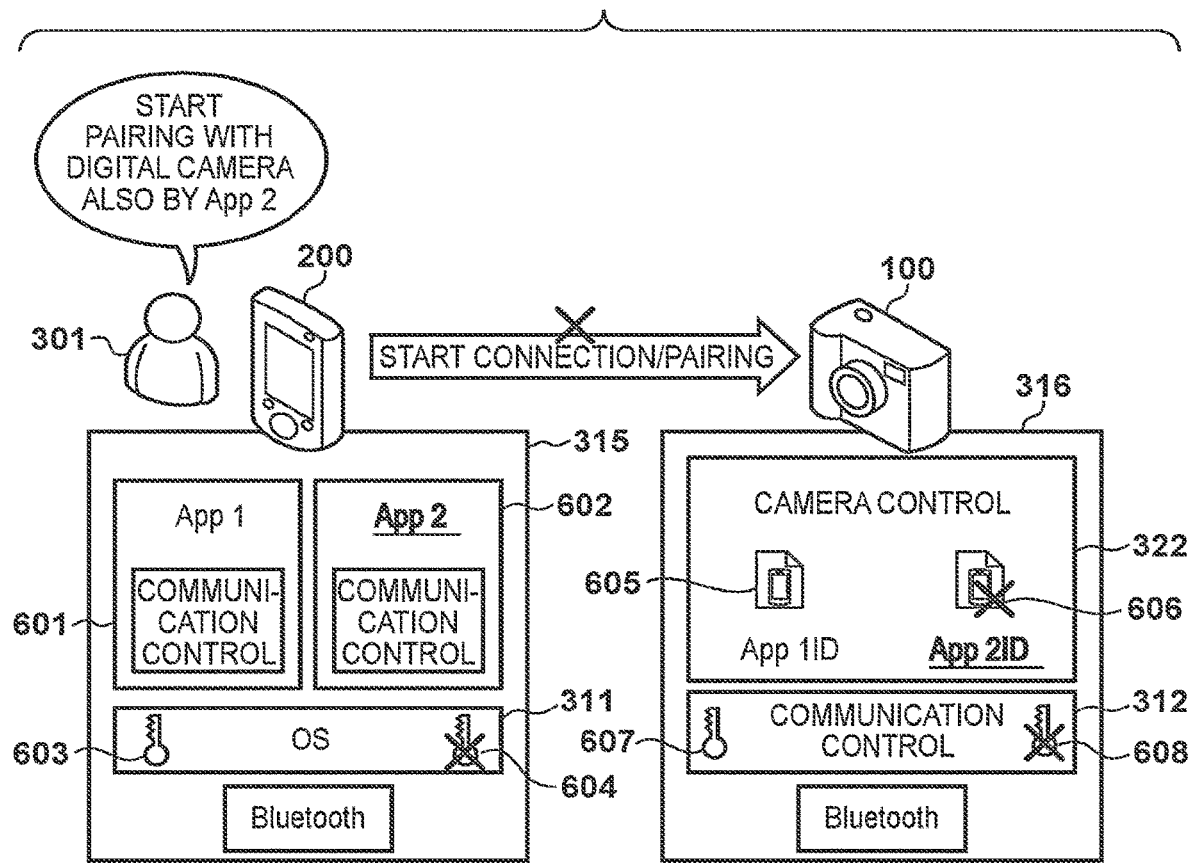
FIG. 6 is a diagram for describing problems associated with realization of a part of functions via another application.

As shown in FIG. 6, once a primary application 601 (App1) on the smartphone 200 has performed pairing with the digital camera 100, a key 603 is stored in the OS 311 of the software module component 315 that operates on the control unit 201. The key 603 is a key for decrypting encryption of communication data, which was exchanged at the time of pairing with the digital camera 100.

Subsequently, in a case where a secondary application 602 (App2) attempts to pair with the digital camera 100, as the key 603 is already stored in the OS 311, a new key 604 cannot be stored in the OS 311. This is because the OS 311 can only store one key for a respective digital camera. Therefore, in the digital camera 100 as well, only a key 607 for decrypting encryption of communication data, which was exchanged at the time of pairing with the primary application 601, can be stored in the communication control module 312 of the software module component 316 that operates on the control unit 101. The digital camera 100 cannot store a key 608 for the secondary application 602 in the communication control module 312.

Similarly, only an application ID 605, which was provided at the time of pairing with the primary application 601, can be stored in the camera control module 322 of the digital camera 100. The digital camera 100 cannot store an application ID 606 of the secondary application 602 in the camera control module 322.

Consequently, the secondary application 602 cannot establish Bluetooth connection with the digital camera 100 on the OS layer. Due to such restrictions on the OS, with conventional techniques, it is difficult for the secondary application 602 to establish, with the digital camera 100, Bluetooth connection different from that made by the primary application 601, and execute functions.

<System Configuration Diagrams for Addressing Problems of FIG. 6>

Figure 7A:
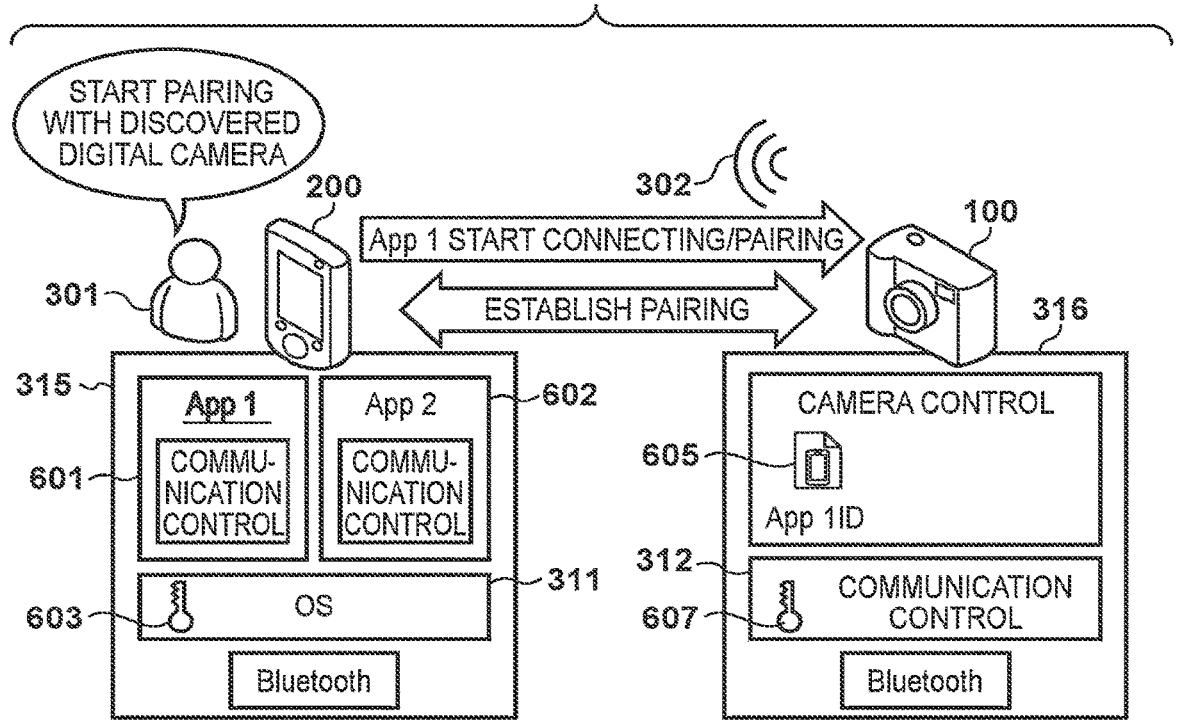
FIGS. 7A to 7C are system configuration diagrams for addressing the problems that have been described with reference to FIG. 6.
Figure 7B:
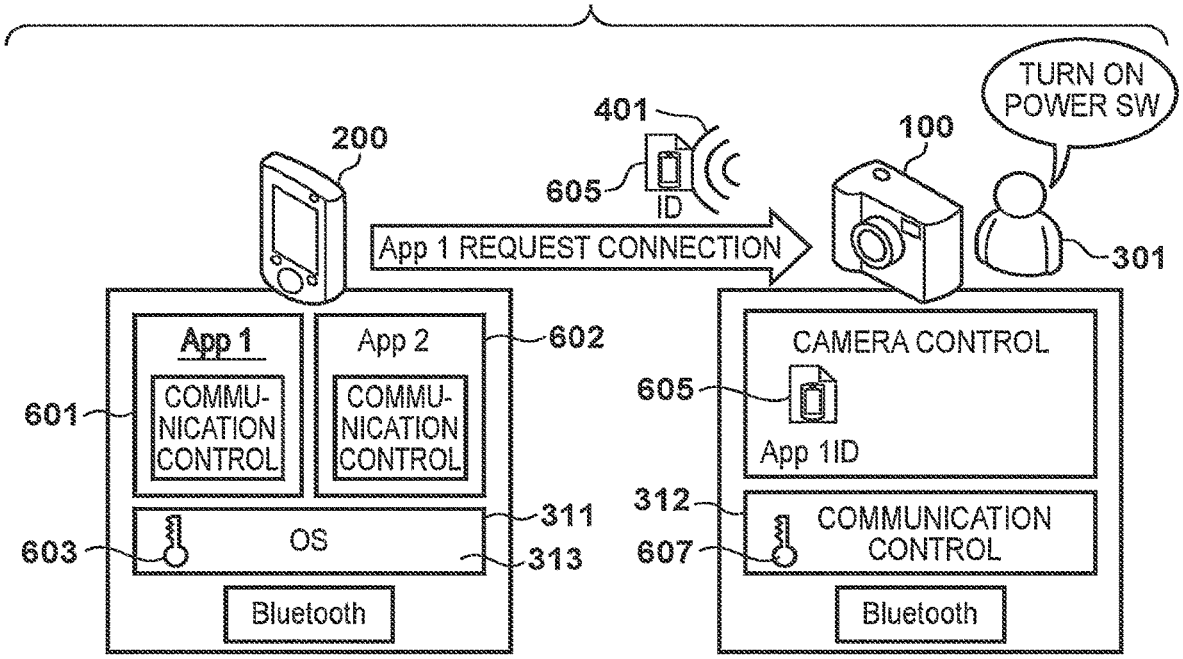
Figure 7C:
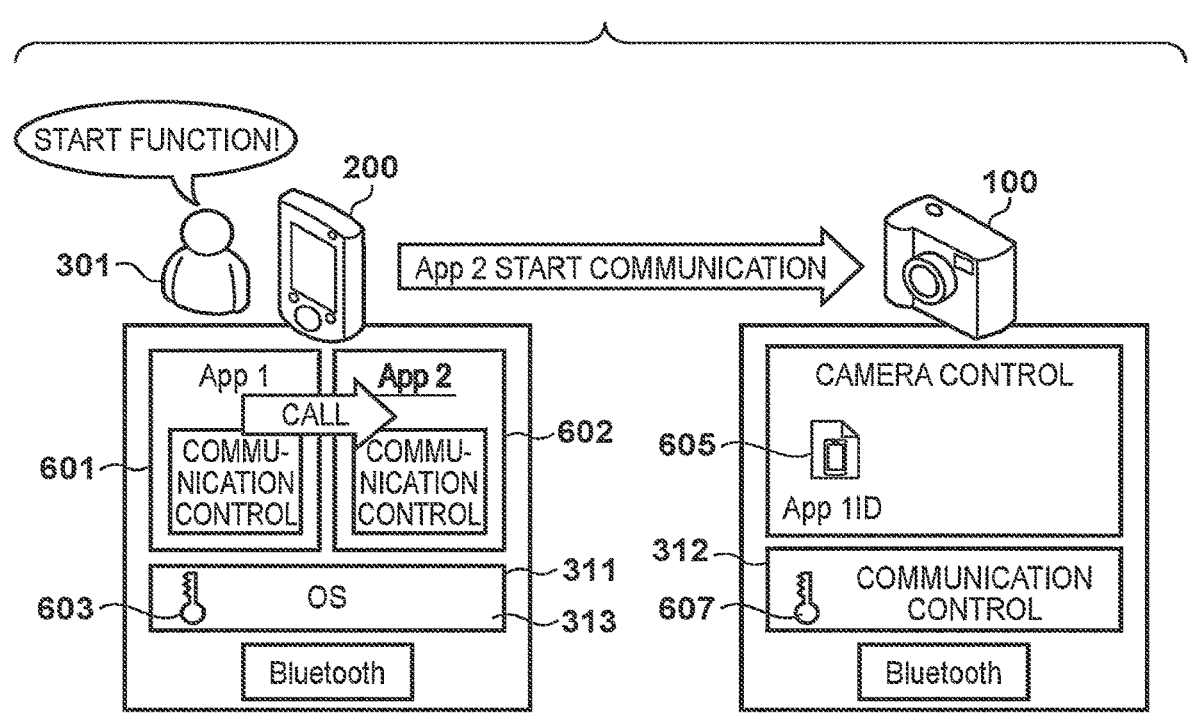

FIGS. 7A to 7C are system configuration diagrams for addressing the problems that have been described with reference to FIG. 6. FIG. 7A illustrates a state where pairing is carried out between the primary application 601 and the digital camera 100. In FIG. 7A, similarly to FIGS. 3A to 3C, the user 301 executes the pairing start of the Bluetooth setting function by operating the digital camera 100. At this time, the user carries out the pairing using the primary application 601 on the smartphone 200.

After the digital camera 100 and the smartphone 200 have made a Bluetooth connection with each other and been placed in a state where they can perform encrypted communication with each other, the digital camera 100 stores an application ID 605 of the primary application 601 in the camera control module 322. Consequently, the digital camera 100 determines that the pairing with the smartphone 200 has been established, and they are placed in a paired state.

Note that the connection between the smartphone 200 and the digital camera 100 may be Bluetooth connection, or may be Bluetooth Low Energy connection (BLE connection). In the description of the present embodiment, it is assumed that these two connections are mentioned without being strictly distinguished from each other. Therefore, in the description of the present embodiment, the connection that is mentioned as Bluetooth connection or BLE connection may be carried out as one of Bluetooth connection and BLE connection unless there are technical contradictions.

FIG. 7B illustrates a state where the primary application 601 reconnects to the digital camera 100. In FIG. 7B, similarly to FIGS. 4A to 4C, the user 301 makes the Bluetooth functions of the digital camera 100 usable by, for example, turning ON the power switch of the digital camera 100 or inserting a battery into the digital camera 100. Subsequently, for the purpose of Bluetooth connection, the digital camera 100 sends out an advertising signal 401, which includes the application ID 605 of the primary application 601 posted therein, to the surrounding. The primary application 601 of the smartphone 200 receives, via the communication unit 212, the advertising signal that has been sent out by the digital camera 100 via the communication unit 112. Then, the primary application 601 distinguishes the application ID of itself from the advertising signal, and determines that it can connect to the digital camera 100. Thereafter, the primary application 601 makes a Bluetooth connection request to the digital camera 100, and Bluetooth connection is established again between the digital camera 100 and the smartphone 200.

FIG. 7C illustrates a state where the primary application 601 accepts a user operation and executes a function. In a case where the function to be executed in accordance with a user's instruction is a function provided by the secondary application 602, the primary application 601 calls up the secondary application 602. The secondary application 602 directly makes a request to the digital camera 100 for control and executes the function via the Bluetooth communication between the smartphone 200 and the digital camera 100 that have already been connected to each other.

As described above, by sharing roles between two applications, the function of communicating with the same digital camera 100 via a plurality of applications can be provided.

<Sequence Diagram: Pairing and Reconnection>

Figure 8:
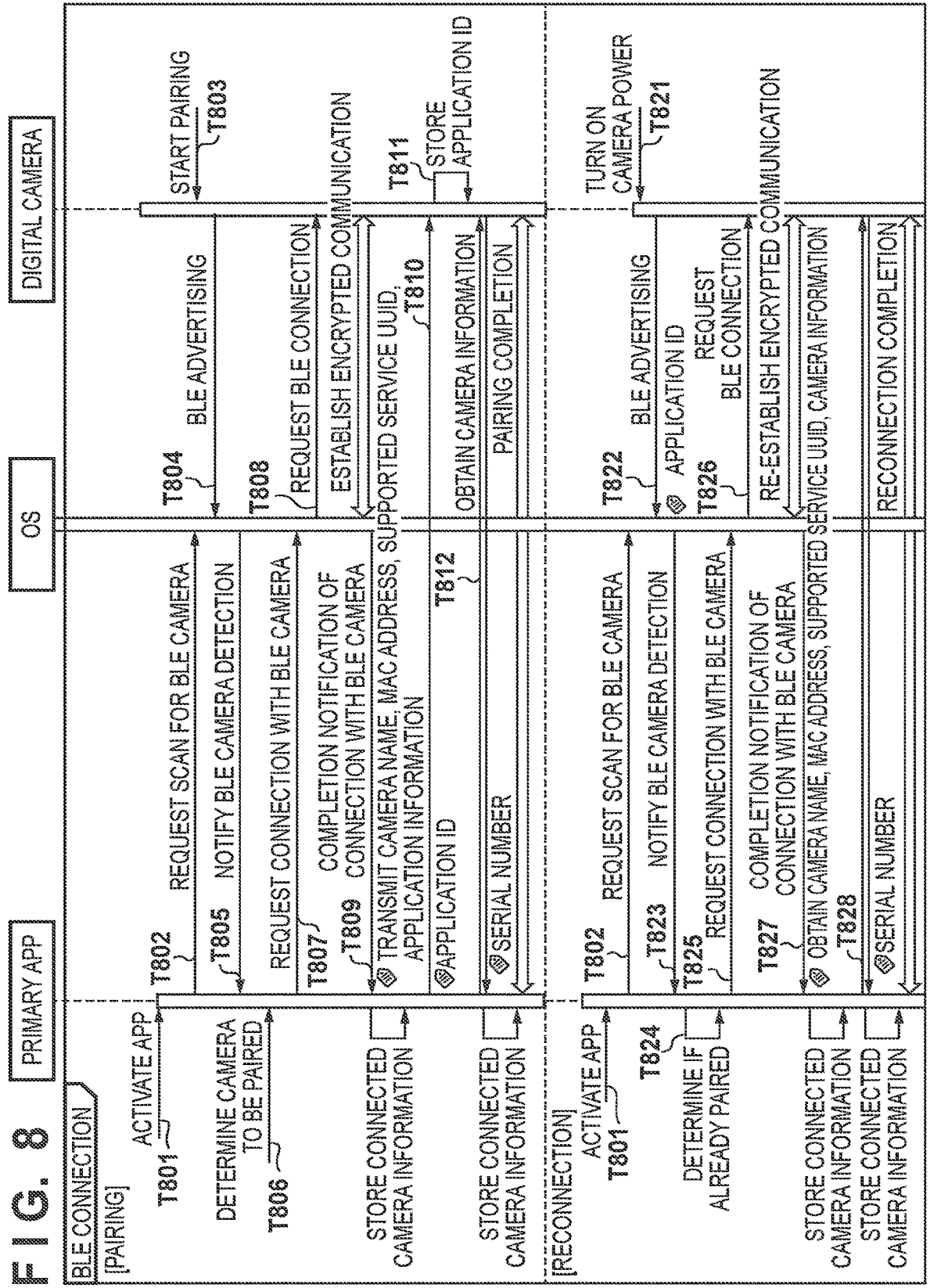
FIG. 8 is a sequence diagram showing a flow of processing in which a primary application carries out Bluetooth pairing and reconnection with the digital camera 100, including the operations of an OS 311.

FIG. 8 is a sequence diagram showing a flow of processing in which the primary application carries out Bluetooth pairing and reconnection with the digital camera 100, including the operations of the OS 311. In the present sequence diagram, the processing, operations, and the like that are described as being executed by the primary application (a first application) are realized by the control unit 201 (e.g., processor) of the smartphone 200 executing the primary application. Similarly, the processing, operations, and the like that are described as being executed by the OS 311 are realized by the control unit 201 (e.g., processor) of the smartphone 200 executing the OS 311. The same goes for the sequence diagrams and flowcharts of FIGS. 9A and 9B and subsequent figures. Furthermore, in the sequence diagrams and flowcharts of FIGS. 9A and 9B and subsequent figures, the processing, operations, and the like that are described as being executed by the secondary application (a second application) are realized by the control unit 201 (e.g., processor) of the smartphone 200 executing the secondary application.

First, processing at the time of pairing will be described. In T801, the user activates the primary application. In T802, the primary application requests the OS 311 to scan Bluetooth devices, and waits for devices to be detected.

Meanwhile, in T803, the user performs an operation for the pairing start by operating the digital camera 100. In T804, the digital camera 100 sends out an advertising signal.

Once the OS 311 has received the advertising signal, the OS 311 notifies the primary application of a detection of a device in T805. The primary application displays a list of only devices supported by the primary application on a pairing screen.

In T806, the user selects a desired digital camera (here, the digital camera 100) from the displayed list of devices. In T807, the primary application informs the OS 311 of a request for connection with the selected digital camera. In response to the request for connection from the primary application, the OS 311 makes the request for connection to the digital camera 100 and establishes encrypted communication in T808. In T809, the OS 311 notifies the primary application of the completion of the connection.

The primary application stores a device name and a Bluetooth MAC address as device information included in the connection completion notification from the OS 311. Also, the primary application can obtain service UUIDs indicating the functions supported by the connected digital camera 100 from the information included in the connection completion notification from the OS 311. With reference to these service UUIDs, the primary application displays the functions included in itself, as well as the functions included in the secondary application, as menu buttons on a screen (e.g., the top menu screen 500) as necessary. Note that there is a case where the primary application cannot obtain the MAC address depending on the type and characteristics of the OS 311.

In T810, the primary application transmits the application ID of itself to the digital camera 100. Upon receiving the application ID, the digital camera 100 stores the application ID as information of the application on a pairing partner in T811.

Furthermore, in T812, the primary application obtains a serial number of the digital camera 100 by requesting the digital camera 100 for the same, and stores the serial number as necessary. Consequently, the smartphone 200 and the digital camera 100 are placed in a paired state, and Bluetooth connection between the smartphone 200 and the digital camera 100 is established on both of the OS layer and the application layer.

Next, processing at the time of reconnection will be described. Similarly to the time of pairing, the user activates the primary application in T801. In T802, the primary application requests the OS 311 to scan Bluetooth devices, and waits for devices to be detected. In T821, the power of the digital camera 100, which has already been paired, is turned ON as a result of, for example, receiving a user operation on the power button. In T822, the digital camera 100 sends out an advertising signal with the application ID stored in T811 posted therein. Once the OS 311 has received the advertising signal, the OS 311 notifies the primary application of a detection of a device in T823. In T824, the primary application determines whether the application ID of itself matches the application ID included in the advertising signal. When they match, the primary application informs the OS 311 of a request for connection with the digital camera 100 in T825. In response to the request for connection from the primary application, the OS 311 makes the request for connection to the digital camera 100 and establishes encrypted communication again in T826.

In T827, the primary application stores a device name and a Bluetooth MAC address as device information included in the connection completion notification from the OS 311. Also, the primary application can obtain service UUIDs indicating the functions supported by the connected digital camera 100 from the information included in the connection completion notification from the OS 311. With reference to these service UUIDs, the primary application displays the functions included in itself, as well as the functions included in the secondary application, as menu buttons on a screen (e.g., the top menu screen 500) as necessary. Note that there is a case where the primary application cannot obtain the MAC address depending on the type and characteristics of the OS 311.

Furthermore, in T828, the primary application obtains a serial number of the digital camera 100 by requesting the digital camera 100 for the same, and stores the serial number as necessary.

<Sequence Diagram: Execution of Function>

Figure 9A:
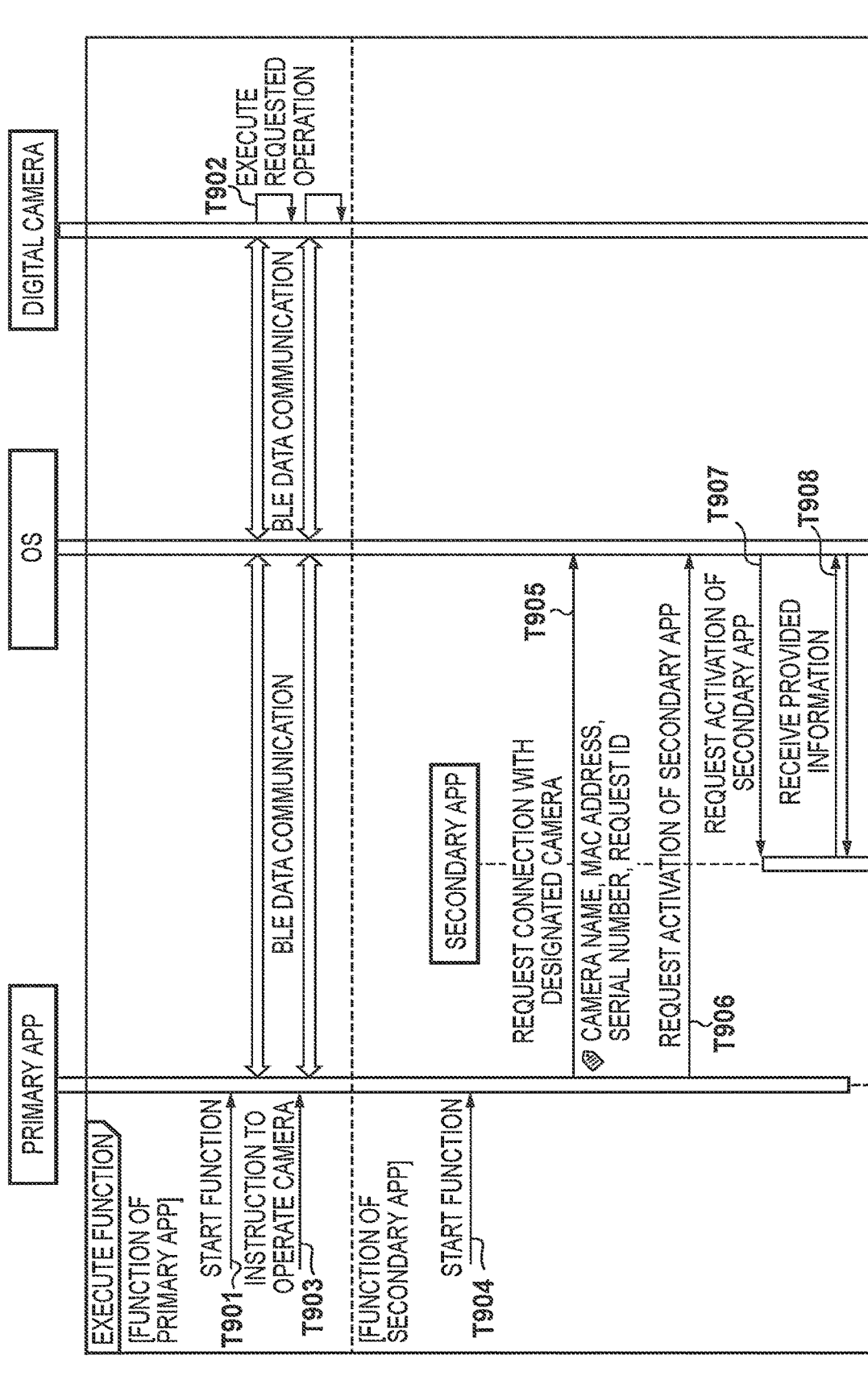

FIGS. 9A and 9B are sequence diagrams showing a flow of processing in which the primary application accepts a user operation and executes a function, including the operations of the OS 311. The user issues an instruction for executing a function by tapping a button displayed on a screen (e.g., the top menu screen 500) of the primary application.

As indicated by T901 and T903, the primary application accepts a start of a function included in the primary application, as well as an operational instruction, via a user operation. In this case, the primary application itself controls the digital camera 100, or executes the function after automatically switching from Bluetooth communication to Wi-Fi communication, by performing Bluetooth communication with the digital camera 100 via the OS 311. As indicated by T902, in response to a request from the primary application, the digital camera 100 executes a requested operation.

On the other hand, as indicated by T904, there is a case where a start of a function included in the secondary application is accepted on the menu of the primary application via a user operation. In this case, in T905, the primary application provides the OS 311 with various types of information, including identification information of the digital camera 100, in order to inform the secondary application of information of the digital camera 100 that is currently connected via Bluetooth communication. These various types of information include a camera name, a MAC address, and a serial number that were obtained and stored at the time of pairing or reconnection. Note, as stated earlier, there is a case where the primary application cannot obtain the MAC address depending on the type of the OS; in this case, the various types of information do not include the MAC address. In order to inform the secondary application of the various types of information, the primary application stores the various types of information, including the identification information of the digital camera 100, into a data sharing area which is provided by the OS 311 and which is intended to share data between applications. This data sharing area may be a predetermined directory inside the nonvolatile memory 203 that is generally accessible, or may be a storage area created under the settings that allow only both applications to access the storage area. Alternatively, the primary application may use a clipboard that uses the work memory 204 provided by the OS 311 as the data sharing area, or may designate the various types of information as parameters at the time of activation of applications.

Subsequently, in T906, the primary application requests the OS 311 to activate the secondary application. In response to the request from the primary application, the OS 311 activates the secondary application in T907. In T908, the secondary application obtains the various types of information, including the identification information of the digital camera 100, from the data sharing area.

Subsequently, based on the identification information of the digital camera 100 obtained from the data sharing area, the secondary application performs connection control for establishing connection for communication between the secondary application and the digital camera 100. The details of this connection control vary depending on the type and characteristics of the OS 311. More specifically, the details of the connection control performed by the secondary application vary depending on whether the OS 311 permits the primary application to obtain a Bluetooth MAC address of a pairing partner.

In a case where the primary application can obtain a Bluetooth MAC address of a pairing partner (here, the digital camera 100), the MAC address is stored into the data sharing area in T905. Therefore, the secondary application can obtain the MAC address from the data sharing area and use this MAC address as the identification information of the digital camera 100 in T907. In this case, in T909, the primary application makes a request for connection with the digital camera 100 by providing the OS 311 with the MAC address. In T910, the OS 311 notifies the secondary application of the completion of connection on the application layer. In processing of the secondary application and the OS 311 in T909 and T910, which is similar to processing of the primary application and the OS 311 in T807 to T809, connection on the OS layer has already been established unlike the case of T807 to T809. Therefore, upon receiving the request for connection, the OS 311 supports the establishment of connection between the secondary application and the digital camera 100 on the application layer, without newly establishing connection with the digital camera 100 on the OS layer.

After the secondary application is placed in a state where it can perform communication with the digital camera 100, in T912, the secondary application performs Bluetooth communication with the digital camera 100 via the OS 311 in order to execute the function pertaining to the instruction issued by the user operation. In T913, the digital camera 100 executes the operation requested by the secondary application.

On the other hand, in a case where the primary application cannot obtain a Bluetooth MAC address of a pairing partner (here, the digital camera 100), the information stored into the data sharing area in T905 does not include the MAC address. Therefore, in T907, the secondary application can neither obtain the MAC address from the data sharing area, nor use the MAC address as the identification information of the digital camera 100. In this case, the secondary application uses the serial number of the digital camera 100 stored in the data sharing area as the identification information of the digital camera 100 (first-type identification information). In T914, the secondary application requests the OS 311 to list the connected cameras (one or more digital cameras with which the OS has established connection) that are supported by the secondary application by designating service UUIDs of functions that are supported by the secondary application itself. In T915, the secondary application obtains a list returned from the OS 311 (one or more pieces of second-type identification information of the one or more digital cameras, respectively).

The secondary application performs loop processing of T916 to T920 with respect to a respective digital camera, in order from the top of the list. Specifically, in T916, the secondary application requests the OS 311 to connect to the digital camera. In T917, the OS 311 notifies the secondary application of the completion of connection on the application layer. In processing of the secondary application and the OS 311 in T916 and T917, which is similar to processing of the primary application and the OS 311 in T807 to T809, connection on the OS layer has already been established unlike the case of T807 to T809. Therefore, upon receiving the request for connection, the OS 311 supports the establishment of connection between the secondary application and the digital camera 100 on the application layer, without newly establishing connection with the digital camera 100 on the OS layer. Thereafter, in T918, the secondary application makes a request to the digital camera 100 for obtainment of a serial number. In T919, the secondary application determines whether the serial number obtained in T918 matches the serial number provided by the primary application (i.e., the serial number obtained from the data sharing area).

In a case where the two serial numbers match, it means that the current connection partner of the secondary application and the connection partner of the primary application (here, the digital camera 100) match. In this case, the secondary application ends the loop processing.

On the other hand, in a case where the two serial numbers do not match, it means that the current connection partner of the secondary application and the connection partner of the primary application (here, the digital camera 100) do not match. Accordingly, in T920, the secondary application makes a disconnection request to the OS 311, and disconnects the connection on the application layer. Note that as the primary application is maintaining the state where it is connected to the digital camera 100, the OS 311 does not disconnect the connection on the OS layer. The OS 311 disconnects the connection with the digital camera 100 on the OS layer when every application has disconnected the connection on the application layer. Thereafter, the secondary application executes processing from the beginning of the loop (T916) with respect to the next digital camera on the list.

Once the secondary application has been able to connect to the digital camera 100 that is the same as the connection partner of the primary application, in T921, the secondary application performs Bluetooth communication with the digital camera 100 via the OS 311 in order to execute the function pertaining to the instruction issued by the user operation. In T922, the digital camera 100 executes the operation requested by the secondary application.

Note that, for the sake of convenience, the above description has been provided under the assumption that the secondary application is already installed on the smartphone 200. However, it is permissible to adopt a configuration in which the secondary application is installed as necessary at a timing when a menu button to which a function provided by the secondary application has been allocated is operated by the user on the top menu screen 500 displayed by the primary application. In this case, between T904 and T905, the primary application determines whether the secondary application is already installed by making an inquiry to the OS 311. Then, in a case where the secondary application has not been installed yet, the primary application requests the OS 311 to activate a store application and display a screen for installing the secondary application. Adopting such a configuration enables the user to execute an intended function by operating the screen of the smartphone 200 as instructed, even if the user has not installed a necessary application in advance by him/herself.

<Flowchart: Primary Application>

Figure 10:
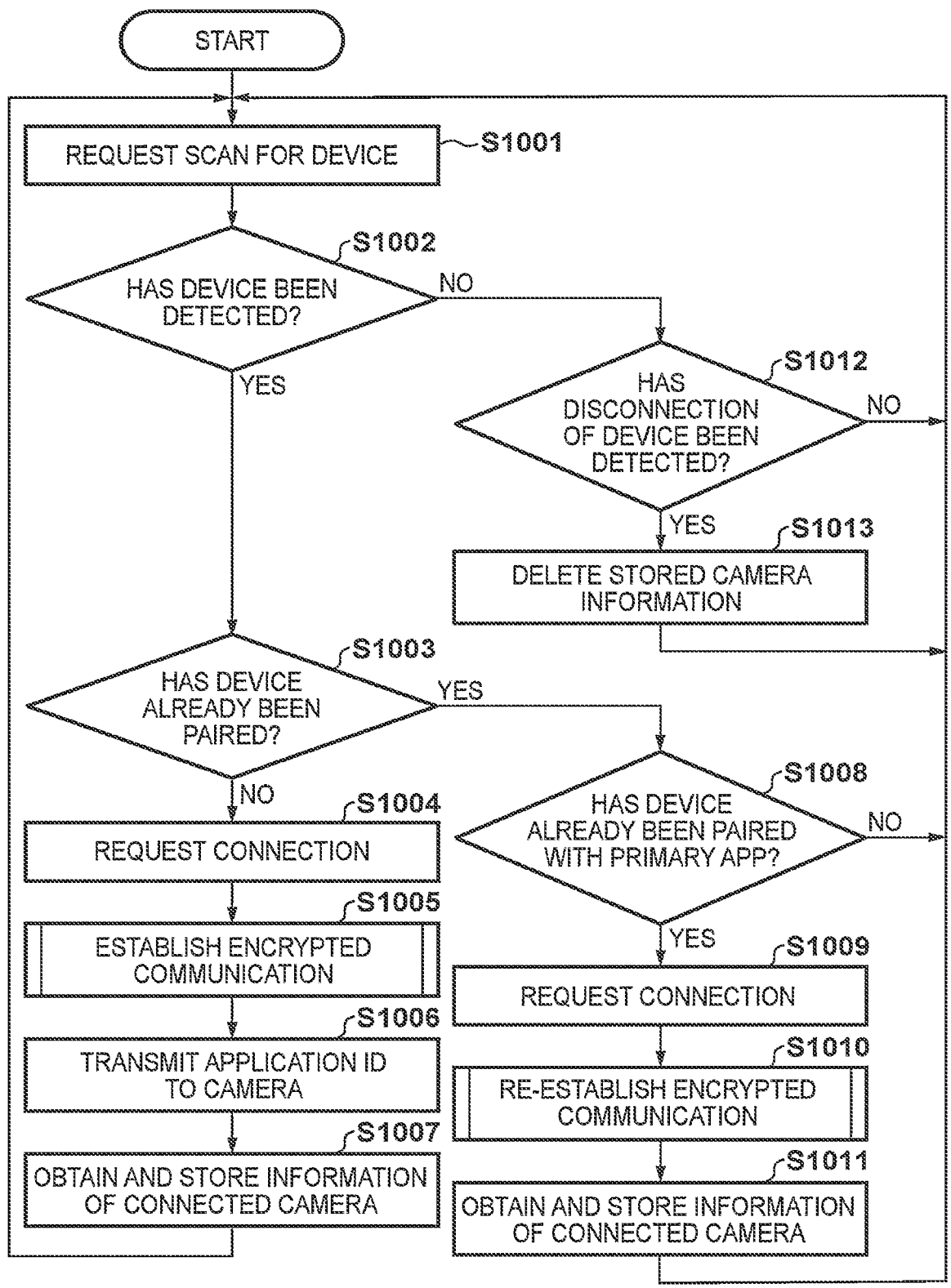
FIG. 10 is a flowchart showing processing of the primary application and the OS 311 that corresponds to the sequence diagram shown in FIG. 8.

FIG. 10 is a flowchart showing processing of the primary application and the OS 311 that corresponds to the sequence diagram shown in FIG. 8.

Once the primary application has been activated, in S1001, the primary application requests the OS 311 to scan Bluetooth devices. In step S1002, the primary application waits for devices to be detected. When the OS 311 receives an advertising signal, the primary application is notified of a detection of a device, and thus the primary application can determine that a device has been detected. In a case where the primary application has determined that no device has been detected, the processing step proceeds to step S1012. In a case where the primary application has determined that a device has been detected, the processing step proceeds to step S1003.

In step S1003, the primary application determines whether the detected device has already been paired by determining whether an application ID is included in the advertising signal. In a case where the primary application has determined that the detected device has already been paired (in a case where the application ID is not included in the advertising signal, i.e., the value of the application ID is "0"), the processing step proceeds to step S1008; otherwise, the processing step proceeds to step S1004.

In step S1004, the primary application displays a list of devices (digital cameras) that are supported by the primary application, among the detected devices, on a screen. When the user has selected a desired digital camera from the displayed list of digital cameras, the primary application informs the OS 311 of a request for connection with the selected digital camera.

In step S1005, the OS 311 makes the request for connection to the digital camera 100, and establishes encrypted communication. Once the OS 311 has notified the primary application of the completion of establishment of encrypted communication, the primary application transmits the application ID of itself to the digital camera 100 in step S1006.

In step S1007, the primary application stores the device name and Bluetooth MAC address of the digital camera acting as a connection partner, together with the serial number, service UUIDs, and so forth.

In step S1008, the primary application determines whether the primary application has already paired with the detected device by determining whether the application ID inside the advertising signal matches the application ID of itself. In a case where the primary application has determined that it has already paired with the detected device, the processing step proceeds to step S1009; otherwise, the processing step returns to step S1001.

In step S1009, the primary application informs the OS of a request for connection with the detected digital camera. In step S1010, the OS 311 makes the request for connection to the digital camera 100, and establishes encrypted communication again.

In step S1011, the primary application stores the device name and Bluetooth MAC address of the digital camera acting as a connection partner, together with the serial number, service UUIDs, and so forth.

In step S1012, the primary application determines whether disconnection of the device has been detected. In a case where the primary application has determined that disconnection of the device has been detected, the processing step proceeds to step S1013; otherwise, the processing step returns to step S1001.

In step S1013, the primary application deletes stored information of the camera that is currently connected.

Figure 11:
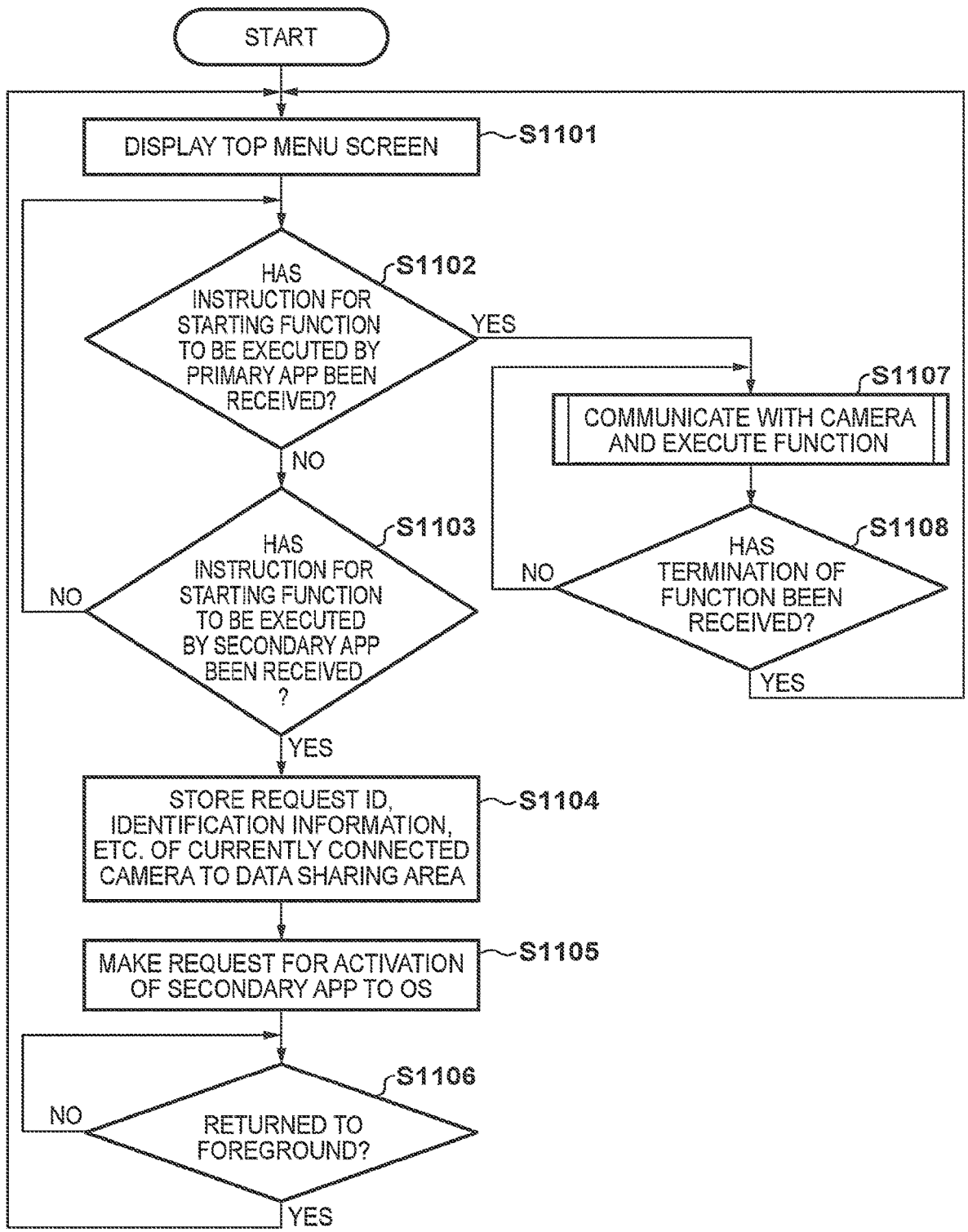
FIG. 11 is a flowchart showing processing of the primary application that corresponds to the sequence diagrams shown in FIGS. 9A and 9B.

FIG. 11 is a flowchart showing processing of the primary application that corresponds to the sequence diagrams shown in FIGS. 9A and 9B.

In step S1101, the primary application displays the top menu screen 500 on which menu buttons for executing usable functions are arranged together with the camera name of the digital camera 100 that is currently connected.

In step S1102, the primary application determines whether a start of a function included in the primary application has been accepted via a user operation. In a case where the primary application has determined that the start of the function included in the primary application has been accepted, the processing step proceeds to step S1107; otherwise, the processing step proceeds to step S1003.

In step S1103, the primary application determines whether a start of a function included in the secondary application has been accepted via a user operation. In a case where the primary application has determined that the start of the function included in the secondary application has been accepted, the processing step proceeds to step S1104; otherwise, the processing step returns to step S1102.

In step S1104, the primary application stores various types of information, including the identification information of the digital camera 100 that is currently connected via Bluetooth communication, into the data sharing area which is provided by the OS 311 and which is intended to share data between applications. Furthermore, the primary application also stores a request ID indicating the function to be started into the data sharing area.

In step S1105, the primary application requests the OS 311 to activate the secondary application. Once the secondary application has been activated normally, the primary application is displayed in the background. Accordingly, in step S1106, the primary application determines whether the primary application has returned to the foreground. The processing step remains at S1106 until the primary application determines that it has returned to the foreground. In a case where the primary application has determined that it has returned to the foreground, the processing step returns to step S1101.

In step S1107, the primary application executes the function of the primary application while, for example, controlling the digital camera 100 by performing Bluetooth communication with the digital camera 100 via the OS 311. In step S1108, the primary application determines whether a termination of the function has been accepted via a user operation. In a case where the primary application has determined that the termination of the function has been received via the user operation, the processing step returns to step S1101; otherwise, the processing step returns to step S1107.

<Flowchart: Secondary Application>

Figure 12A:
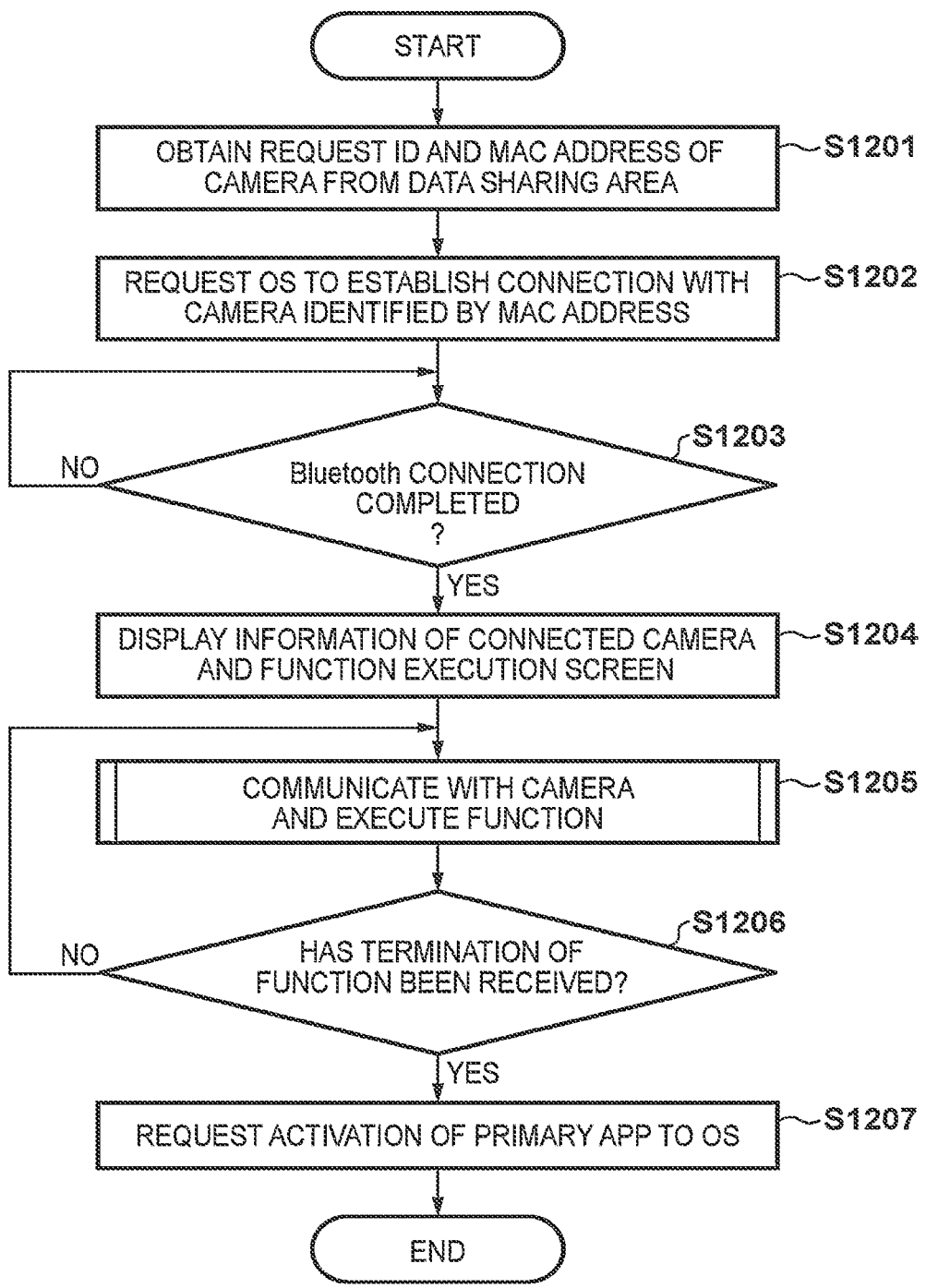
FIG. 12A is a flowchart showing processing of a secondary application that corresponds to the sequence diagrams shown in FIGS. 9A and 9B.
Figure 12B:
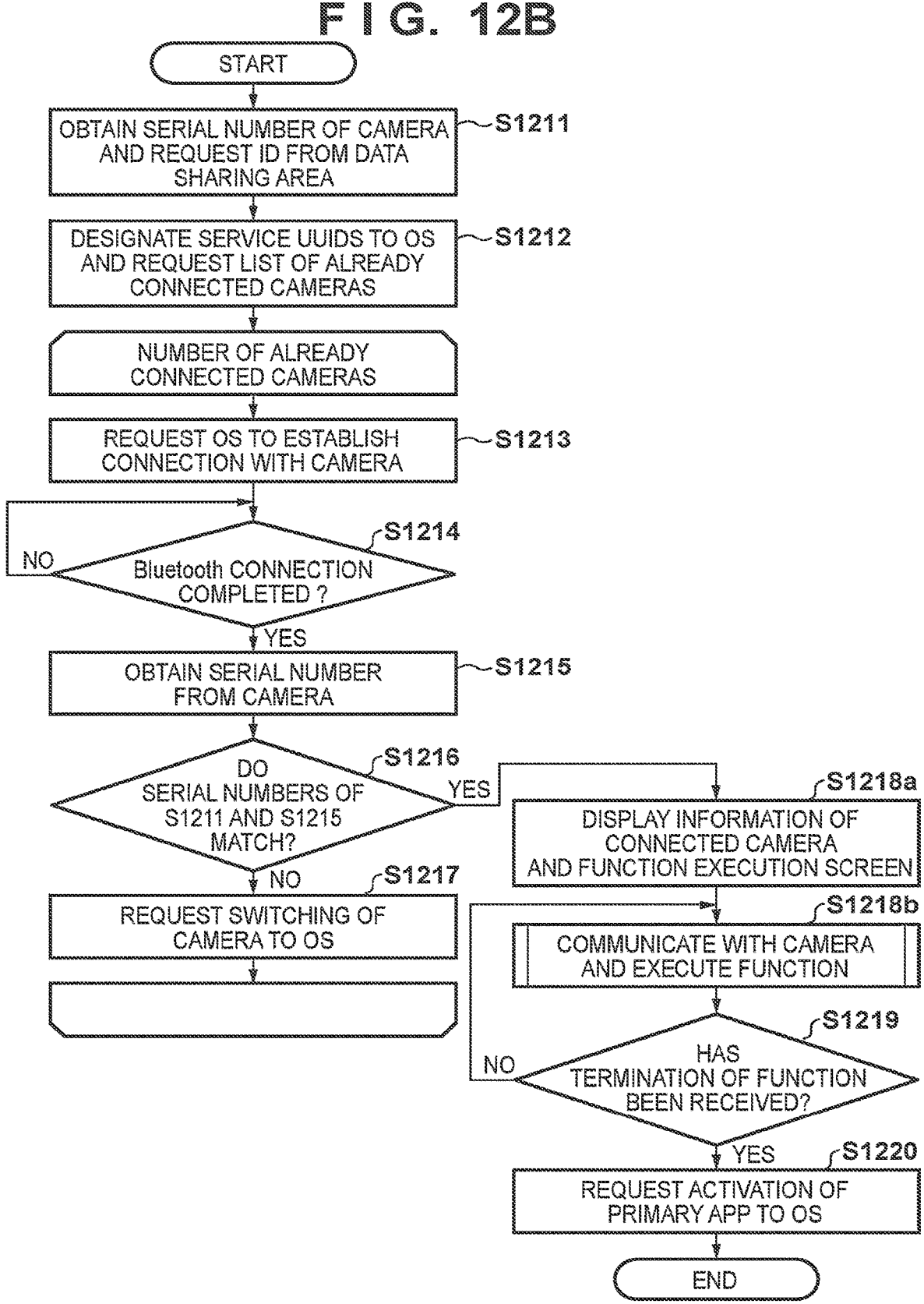
FIG. 12B is a flowchart showing processing of a secondary application that corresponds to the sequence diagrams shown in FIGS. 9A and 9B.

FIG. 12A and FIG. 12B are flowcharts showing processing of the secondary application that corresponds to the sequence diagrams shown in FIGS. 9A and 9B. FIG. 12A corresponds to a case where the OS 311 permits the primary application to obtain a Bluetooth MAC address of a pairing partner. FIG. 12B corresponds to a case where the OS 311 does not permit the primary application to obtain a Bluetooth MAC address of a pairing partner.

First, FIG. 12A will be described. When activated by the OS 311 in response to the request from the primary application, the secondary application obtains various types of information including the MAC address of the digital camera 100, as well as the request ID, from the data sharing area in step S1201. In step S1202, the secondary application requests the OS 311 to establish connection with the digital camera 100 identified by the MAC address by providing the OS 311 with the MAC address.

In step S1203, the secondary application waits until it is placed in a state where it can communicate with the digital camera 100. When the secondary application has determined that it has been placed in a state where it can communicate with the digital camera 100, the processing step proceeds to step S1204. In step S1204, the secondary application displays, for example, the camera name as information of the connected digital camera 100, and also displays a screen (e.g., the BLE remote shooting screen 520) of the function corresponding to the request ID provided by the primary application.

In step S1205, the secondary application executes a function corresponding to a user operation on the BLE remote shooting screen 520 by performing Bluetooth communication with the digital camera 100 via the OS 311. In step S1206, the secondary application determines whether an operation to terminate the function has been received from the user. In a case where the secondary application has determined that the operation to terminate the function has been received from the user, the processing step proceeds to step S1207; otherwise, the processing step returns to step S1205. In step S1207, the secondary application requests the OS 311 to activate the primary application.

Next, FIG. 12B will be described. As stated earlier, in a case where the primary application cannot obtain a MAC address of a Bluetooth device from the OS 311, the secondary application uses a serial number as identification information of a digital camera, instead of the MAC address.

When activated by the OS 311 in response to the request from the primary application, the secondary application obtains various types of information including the serial number of the digital camera 100, as well as the request ID, from the data sharing area in step S1211. In step S1212, the secondary application designates, to the OS 311, service UUIDs of functions that are supported by the secondary application itself, makes a request for a list of supporting cameras that have already been connected, and obtains a list of the cameras.

The secondary application executes loop processing of steps S1213 to S1217 with respect to a respective digital camera, in order from the top of the list. Specifically, in step S1213, the secondary application requests the OS 311 to connect to the digital camera. Processing of the present step corresponds to processing of T916. That is to say, in response to this request for connection, the OS 311 supports connection on the application layer.

In subsequent step S1214, the secondary application waits until it is placed in a state where it can communicate with the digital camera. When the secondary application has determined that it has been placed in a state where it can communicate with the digital camera, the processing step proceeds to step S1215.

In step S1215, the secondary application makes a request to the digital camera for obtainment of a serial number. In step S1216, the secondary application determines whether the serial number obtained in step S1215 matches the serial number provided by the primary application (i.e., the serial number obtained from the data sharing area). In a case where the secondary application has determined that the two serial numbers match, the processing step proceeds to step S1218*a*. In a case where the secondary application has determined that the two serial numbers do not match, the processing step proceeds to step S1217.

In step S1217, the secondary application makes a request to the OS 311 for disconnection, and disconnects the connection on the application layer. Thereafter, the secondary application executes processing from the beginning of the loop (step S1213) with respect to the next digital camera on the list.

In step S1218*a*, the secondary application displays, for example, the camera name as information of the connected digital camera 100, and also displays a screen (e.g., the BLE remote shooting screen 520) of the function corresponding to the request ID provided by the primary application.

In step S1218*b*, the secondary application executes a function corresponding to a user operation on the BLE remote shooting screen 520 by performing Bluetooth communication with the digital camera 100 via the OS 311. In step S1219, the secondary application determines whether an operation to terminate the function has been received from the user. In a case where the secondary application has determined that the operation to terminate the function has been received from the user, the processing step proceeds to step S1220; otherwise, the processing step returns to step S1218*b*. In step S1220, the secondary application requests the OS 311 to activate the primary application.

As described above, according to the first embodiment, the smartphone 200 includes the primary application (first application) and the secondary application (second application) that operate on the OS 311. The primary application requests the OS 311 to establish connection for communication between the primary application and the digital camera 100, obtains identification information of the digital camera 100, and stores the identification information into the data sharing area provided by the OS 311. The secondary application obtains the identification information from the data sharing area, and based on the identification information, performs connection control for establishing connection for communication between the secondary application and the digital camera 100. As has been described with reference to FIGS. 9A and 9B, the details of the connection control performed by the secondary application vary depending on whether the OS 311 permits the primary application to obtain a Bluetooth MAC address of a pairing partner. According to the first embodiment, the foregoing configuration allows a plurality of applications (the primary application and the secondary application) on the smartphone 200 to smoothly connect to the digital camera 100.

Second Embodiment

The first embodiment has been described in relation to a configuration in which the primary application prepares and displays a function start button for the secondary application, and requests the OS 311 to activate the secondary application in response to a user operation. A second embodiment will be described in relation to a configuration in which the secondary application itself can start a function upon receiving a user operation, without using the function start button on the primary application. In order to realize this, in the second embodiment, the primary application causes various types of information, including identification information of the digital camera 100 with which the primary application is currently connected, to be stored in an up-to-date condition into the data sharing area in such a manner that they can always be referenced by the secondary application. Note that in the second embodiment, the basic configurations and operations of the digital camera 100 and the smartphone 200 are similar to those according to the first embodiment. The following mainly describes differences from the first embodiment.

FIG. 13 is a sequence diagram of processing of the primary application and the OS 311 according to the second embodiment. The following description centers on differences from the sequence diagram shown in FIG. 8.

Both at the time of pairing and at the time of reconnection, the primary application stores a device name and a Bluetooth MAC address as device information included in a connection completion notification from the OS, and obtains and stores a serial number as well because there is a case where the MAC address cannot be obtained depending on the type and characteristics of the OS 311, as has been described using FIG. 8. Furthermore, the primary application obtains service UUIDs indicating the functions supported by a connected camera, as has been described using FIG. 8.

In the present embodiment, as indicated by T1301, the primary application stores these pieces of information of the digital camera 100 that is currently connected, namely the camera name, MAC address, serial number, supported service UUIDs, and so forth, into the data sharing area at the timing of connection with the digital camera 100. However, as stated earlier, the MAC address may not be stored depending on the characteristics of the OS 311. Furthermore, in a case where the connection with the digital camera 100 has been disconnected by, for example, performing a power-OFF operation on the digital camera 100 as indicated by T1302, the OS 311 notifies the primary application of the disconnection of the digital camera 100 in T1303. Then, in T1304, the primary application deletes the pieces of information stored in T1301 from the data sharing area.

Figure 14:
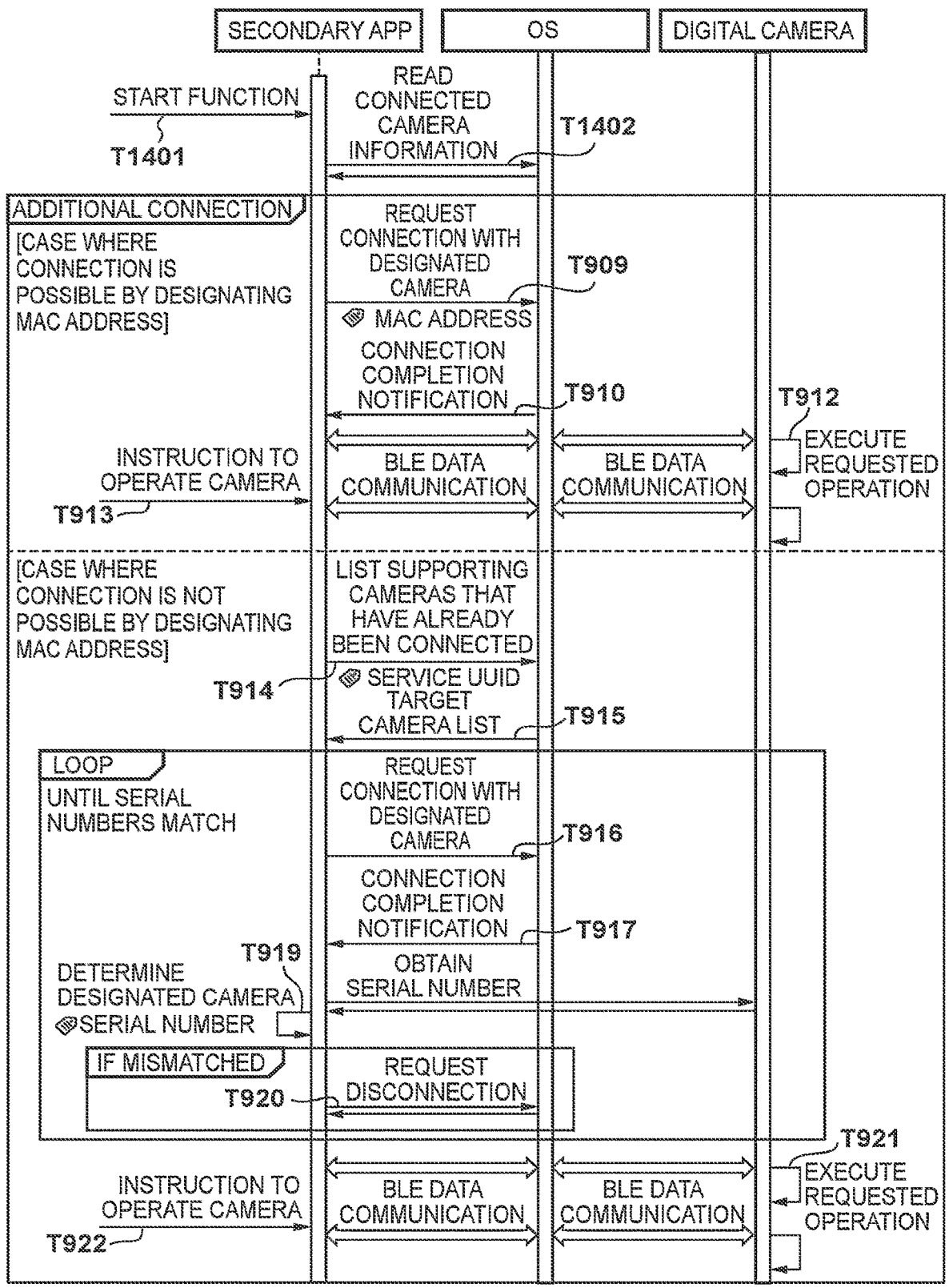
FIG. 14 is a sequence diagram of processing of the secondary application and the OS 311 according to the second embodiment.

FIG. 14 is a sequence diagram of processing of the secondary application and the OS 311 according to the second embodiment. The following description centers on differences from the sequence diagrams shown in FIGS. 9A and 9B.

In T1401, an instruction for starting a function is issued to the secondary application via a user operation upon activation of the secondary application via a user operation, or display of the secondary application in the foreground. In T1402, the secondary application obtains information of the digital camera 100 with which the primary application is currently connected, namely the camera name, MAC address, serial number, and supported service UUIDs, stored in the data sharing area. However, as stated earlier, the MAC address may not be obtained depending on the characteristics of the OS 311. Here, if the secondary application obtains a service UUID that denotes a function supported by itself, the secondary application can perform connection control using the MAC address and serial number in a procedure described with reference to FIGS. 9A and 9B so as to be capable of performing Bluetooth communication with the digital camera 100, and start the function.

Third Embodiment

In the first embodiment and the second embodiment, as the primary application plays a role in executing the processing for reconnection with the digital camera 100, the secondary application can start a function only when the primary application has been activated. A third embodiment will be described in relation to a configuration in which, once the pairing has been carried out on the primary application, reconnection with the digital camera 100 and execution of a function can be carried out as long as the secondary application has been activated.

In order to realize this, the primary application also stores the application ID of the primary application into the data sharing area that can be referenced by the secondary application, in addition to the identification information and the like of the digital camera 100. Also, the secondary application is configured to be capable of scanning Bluetooth devices and performing reconnection. That is to say, the present embodiment adopts a configuration in which steps S1001 to S1003 and steps S1008 to S1011 in the processing of the primary application for reconnection with the digital camera 100, which have been described with reference to FIG. 10, can be executed on the secondary application as well.

Note that in other aspects, the present embodiment is similar to the first embodiment or the second embodiment.

Fourth Embodiment

The first embodiment has been described in relation to a configuration in which the smartphone 200 and the digital camera 100 are connected to each other via Bluetooth, and in which the secondary application provides the user with a BLE remote shooting function by way of coordination between the primary application and the secondary application. A fourth embodiment will be described in relation to a configuration in which the smartphone 200 and the digital camera 100 are connected to each other via Wi-Fi, and in which the secondary application provides the user with a Wi-Fi remote shooting function by way of coordination between the primary application and the secondary application.

Note that in the fourth embodiment, the basic configurations and operations of the digital camera 100 and the smartphone 200 are similar to those according to the first embodiment, second embodiment, or third embodiment. The following mainly describes differences from each of the embodiments described above.

The description will be provided using the examples of application screens shown in FIGS. 5A to 5C. In the present embodiment, it is assumed that the top menu screen 500 shown in FIG. 5A is provided by the primary application, whereas the Wi-Fi remote shooting screen 510 shown in FIG. 5B is provided by the secondary application.

As stated earlier, the primary application has a function of automatically switching from Bluetooth communication to Wi-Fi communication at the time of execution of a function. Wireless LAN connection (Wi-Fi connection) may be established between the smartphone 200 and the digital camera 100 using this function. It is permissible to adopt a configuration in which, in a case where the digital camera 100 does not have a Bluetooth communication function, wireless LAN connection is established in advance between the smartphone 200 and the digital camera 100, and thereafter, the primary application connects to the digital camera 100 using device detection processing based on, for example, UPnP in the wireless LAN.

Once the primary application has established wireless LAN connection with the digital camera 100, it displays menu buttons for the Wi-Fi remote shooting function to be provided on the secondary application. Upon accepting an operation on the Wi-Fi remote shooting button 502 on the top menu screen 500 via a user operation, the primary application makes wireless LAN connection with the digital camera 100 as necessary, and provides the secondary application with an IP address of the digital camera 100 in the wireless LAN by storing the same into the data sharing area. This IP address of the digital camera 100 may be shared in advance between the digital camera 100 and the smartphone 200, via Bluetooth, as a communication parameter (e.g., an SSID, a password, etc.) necessary for wireless LAN connection, or may be obtained by the smartphone 200 upon device detection based on UPnP and the like in the wireless LAN. Basic processing is similar to that according to each of the embodiments described above, except that the IP address for the wireless LAN is used as identification information of the digital camera 100 instead of the Bluetooth MAC address.

In the flowchart shown in FIG. 11, which pertains to the time of execution of a function on the primary application, the primary application stores the IP address of the digital camera 100 into the data sharing area instead of the Bluetooth MAC address and the serial number described in step S1104.

In the flow diagram shown in FIG. 12A, which pertains to the time of execution of a function on the secondary application, the secondary application obtains the IP address of the digital camera 100 instead of the Bluetooth MAC address and the serial number in step S1201. In step S1202, the secondary application makes a request for establishment of Wi-Fi connection with protocols necessary for executing the function with use of the IP address instead of the MAC address. In step S1203, the secondary application waits for the completion of connection with the digital camera 100, and the processing step proceeds to step S1204 upon completion of connection. In this way, the secondary application can provide a function that uses Wi-Fi communication.

Note that in the case of a function that uses Wi-Fi communication, it is necessary, as a rule, that protocols based on IP communication of the digital camera 100 support multiple clients. However, even if multiple clients are not supported, it is sufficient that the OS 311 disconnect IP communication on the primary application side, and the secondary application establish IP communication instead. At this time, IP communication is interrupted, but it is sufficient that the digital camera 100 execute necessary processing as appropriate by, for example, providing a mode of standby for reconnection.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-030177, filed Feb. 28, 2022 which is hereby incorporated by reference herein in its entirety.

What is claimed is:

1. A communication apparatus, comprising:
   a recording medium having recorded therein an operating system OS, a first application that operates on the OS, and a second application that operates on the OS; and
   a processor,
   wherein
   when executed by the processor, the first application causes the processor to:
   request the OS to establish connection for communication between the first application and an external apparatus;
   obtain identification information of the external apparatus; and
   store the identification information into a data sharing area provided by the OS,
   when executed by the processor, the second application causes the processor to:
   obtain the identification information from the data sharing area; and
   based on the identification information, perform connection control for establishing connection for communication between the second application and the external apparatus, wherein the identification information stored into the data sharing area is first-type identification information of the external apparatus, and
   performing the connection control includes:
   obtaining, from the OS, one or more pieces of second-type identification information of one or more external apparatuses, respectively, with which the OS has established connection;
   requesting the OS to establish connection for communication between the second application and a respective external apparatus included among the one or more external apparatuses;
   obtaining first-type identification information of the respective external apparatus via the connection for communication with the respective external apparatus;
   determining whether the first-type identification information of the respective external apparatus matches the first-type identification information obtained from the data sharing area; and
   in a case where the first-type identification information of the respective external apparatus does not match the first-type identification information obtained from the data sharing area, requesting the OS to disconnect the connection for communication with the respective external apparatus.

2. The communication apparatus according to claim 1, wherein
performing the connection control includes requesting the OS to establish the connection for communication between the second application and the external apparatus by providing the OS with the identification information.

3. The communication apparatus according to claim 1, wherein
the connection for communication between the first application and the external apparatus, as well as the connection for communication between the second application and the external apparatus, is Bluetooth connection or Bluetooth Low Energy connection, and
the identification information is a Bluetooth MAC address of the external apparatus.

4. The communication apparatus according to claim 1, wherein
the connection for communication between the first application and the external apparatus, as well as the connection for communication between the second application and the external apparatus, is Wi-Fi connection, and
the identification information is an IP address of the external apparatus.

5. The communication apparatus according to claim 1, wherein
the first-type identification information of the external apparatus is a serial number of the external apparatus, and
the first-type identification information of the respective external apparatus is a serial number of the respective external apparatus.

6. The communication apparatus according to claim 1, wherein
when executed by the processor, the first application further causes the processor to request the OS to activate the second application.

7. A communication control method executed by a processor, wherein
the method comprises, by the processor executing a first application that operates on an operating system OS,
requesting the OS to establish connection for communication between the first application and an external apparatus,
obtaining identification information of the external apparatus, and
storing the identification information into a data sharing area provided by the OS,
the method comprises, by the processor executing a second application that operates on the OS,
obtaining the identification information from the data sharing area, and
based on the identification information, performing connection control for establishing connection for communication between the second application and the external apparatus, wherein the identification information stored into the data sharing area is first-type identification information of the external apparatus, and
performing the connection control includes:

obtaining, from the OS, one or more pieces of second-type identification information of one or more external apparatuses, respectively, with which the OS has established connection;
requesting the OS to establish connection for communication between the second application and a respective external apparatus included among the one or more external apparatuses;
obtaining first-type identification information of the respective external apparatus via the connection for communication with the respective external apparatus;
determining whether the first-type identification information of the respective external apparatus matches the first-type identification information obtained from the data sharing area; and
in a case where the first-type identification information of the respective external apparatus does not match the first-type identification information obtained from the data sharing area, requesting the OS to disconnect the connection for communication with the respective external apparatus.

8. A non-transitory computer-readable storage medium which stores a second application that operates on an operating system OS, wherein when executed by a processor of a communication apparatus, the second application causes the processor to:
obtain, from a data sharing area provided by the OS, identification information of an external apparatus stored into the data sharing area by a first application; and
based on the identification information, perform connection control for establishing connection for communication between the second application and the external apparatus,
wherein the identification information stored into the data sharing area is first-type identification information of the external apparatus, and
performing the connection control includes:
obtaining, from the OS, one or more pieces of second-type identification information of one or more external apparatuses, respectively, with which the OS has established connection;
requesting the OS to establish connection for communication between the second application and a respective external apparatus included among the one or more external apparatuses;
obtaining first-type identification information of the respective external apparatus via the connection for communication with the respective external apparatus;
determining whether the first-type identification information of the respective external apparatus matches the first-type identification information obtained from the data sharing area; and
in a case where the first-type identification information of the respective external apparatus does not match the first-type identification information obtained from the data sharing area, requesting the OS to disconnect the connection for communication with the respective external apparatus.

* * * * *